(12) United States Patent
Wang et al.

(10) Patent No.: US 12,469,532 B2
(45) Date of Patent: Nov. 11, 2025

(54) SYSTEMS FOR NEAR-SENSOR ANALOGUE COMPUTING FOR ULTRAFAST RESPONSIVE TACTILE SENSING

(71) Applicant: Nanyang Technological University, Singapore (SG)

(72) Inventors: Ming Wang, Singapore (SG); Jiaqi Tu, Singapore (SG); Xiaodong Chen, Singapore (SG)

(73) Assignee: Nanyang Technological University, Singapore (SG)

( * ) Notice: Subject to any disclaimer, the term of this patent is extended or adjusted under 35 U.S.C. 154(b) by 169 days.

(21) Appl. No.: 18/285,937

(22) PCT Filed: Apr. 22, 2022

(86) PCT No.: PCT/SG2022/050244
§ 371 (c)(1),
(2) Date: Oct. 6, 2023

(87) PCT Pub. No.: WO2022/225465
PCT Pub. Date: Oct. 27, 2022

(65) Prior Publication Data
US 2024/0233789 A1    Jul. 11, 2024

(30) Foreign Application Priority Data
Apr. 23, 2021    (SG) ............. 10202104150U

(51) Int. Cl.
*G11C 7/16*    (2006.01)
*G11C 7/10*    (2006.01)
*G11C 13/00*    (2006.01)

(52) U.S. Cl.
CPC .............. *G11C 7/16* (2013.01); *G11C 7/1006* (2013.01); *G11C 13/0002* (2013.01)

(58) Field of Classification Search
CPC ..... G11C 7/16; G11C 7/1006; G11C 13/0002; G11C 7/02; G11C 11/22; G11C 13/0004;
(Continued)

(56) References Cited

U.S. PATENT DOCUMENTS 10,489,700 B1    11/2019    Asnaashari et al.

FOREIGN PATENT DOCUMENTS

| CN | 111076770 A | * | 4/2020 | ............. G01D 21/02 |
| CN | 111537111 A | * | 8/2020 | ............. G01L 1/005 |

(Continued)

OTHER PUBLICATIONS

Shuai (Year: 2020).*
(Continued)

*Primary Examiner* — Fernando Hidalgo
(74) *Attorney, Agent, or Firm* — Tyler Sisk; Casimir Jones SC

(57) ABSTRACT

A tactile near-sensor analogue computing system and an artificial skin system are provided. The tactile near-sensor analogue computing system includes a tactile sensor array and a memristive computing array. The tactile sensor array is configured to capture data and includes a plurality of tactile sensing devices. The memristive computing array is configured to process the data and includes a plurality of memristive devices, each of the plurality of tactile sensing devices connected to one of the plurality of memristive devices.

13 Claims, 22 Drawing Sheets

(58) Field of Classification Search
CPC ............ G11C 13/0007; G11C 2213/32; G11C 2213/77; G06N 3/065
USPC .................................................. 365/185.03
See application file for complete search history.

(56) References Cited

FOREIGN PATENT DOCUMENTS

| | | | | |
|---|---|---|---|---|
| CN | 111585563 A | * | 8/2020 | ......... H03K 17/9645 |
| WO | 2021072817 A1 | | 4/2021 | |

OTHER PUBLICATIONS

Liu (Year: 2020).*
Li, Can et al. "Analogue signal and image processing with large memristor crossbars." Nature Electronics 1 (2018):52-59, Dec. 4, 2017.
Chen, Z. et al., Bioinspired Artificial Sensory Nerve Based on Nafion Memristor, Feb. 21, 2019, vol. 29, No. 20, 1808783 [Retrieved on Jun. 20, 2022] <DOI: 10.1002/ADFM.201808783>.

* cited by examiner

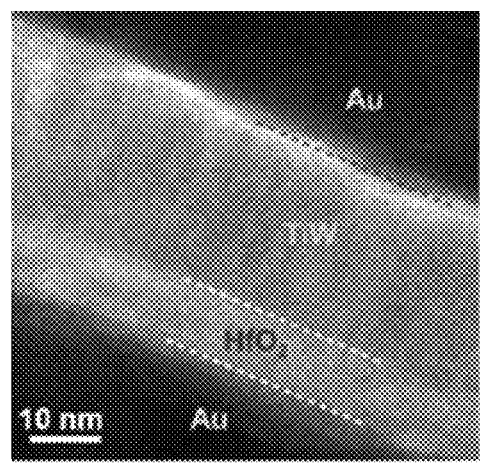
900    *FIG. 9*
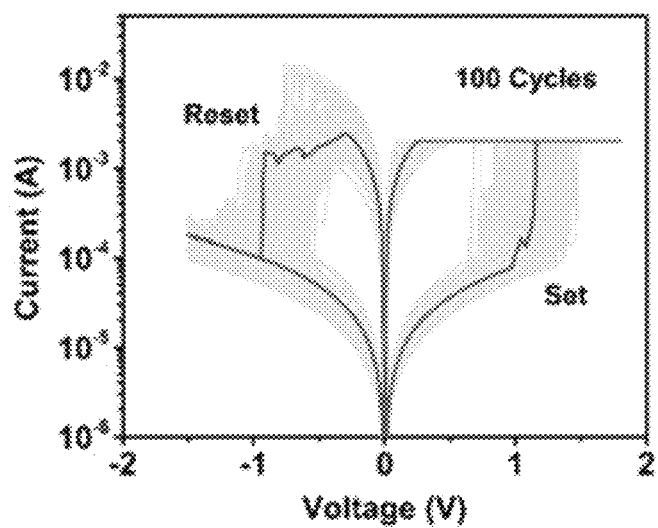
1000
*FIG. 10A*

1300

1330

1500

1530

SYSTEMS FOR NEAR-SENSOR ANALOGUE COMPUTING FOR ULTRAFAST RESPONSIVE TACTILE SENSING

PRIORITY CLAIM

This application is a national stage application of PCT/SG2022/050244, filed on 22 Apr. 2022, which claims priority from Singapore application Ser. No. 10202104150U filed on 23 Apr. 2021, the contents of which are hereby incorporated by reference in their entirety for all purposes.

TECHNICAL FIELD

The present invention generally relates to tactile sensing, and more particularly relates to systems for near-sensor analogue computing for ultrafast responsive tactile sensing.

BACKGROUND OF THE DISCLOSURE

Artificial electronic skin deployed in advanced intelligent systems such as wearable devices, prosthetic hands and robotics skins have numerous flexible sensory nodes to capture surrounding tactile stimuli. Conventionally, these nodes are interfaced with front-end electronics that convert and transmit the tactile signals to external computers or the cloud for data processing. This setup results in long latency (milliseconds) and consumes a lot of energy (milliwatts). These issues are amplified in large-scale and multifunctional systems such as body sensor networks and tactile internet that require yet more nodes to function.

Edge computing, where computation tasks are performed near the data source, has shortened response latency and reduced energy consumption in various computing devices and architectures. For example, commercial computing units have been integrated into flexible or stretchable sensing systems to form advanced artificial skin systems with built-in data processing and analytics capabilities. However, these systems still rely on von Neumann computing architecture, which requires raw analogue signals to be converted into a digital format before computation. Such data conversion continues to limit the response speed of such sensory systems.

Recent processing-in-memory studies show that memristor devices, which can directly compute analogue data through physical resistive networks, are capable of solving complex tasks, such as image compression, sparse representation, and linear system solver, in a time- and energy-efficient ways. Computations in these scenarios rely heavily on the array architecture for vector-matrix multiplication (VMM) operations, whereby input voltages and conductance of the memristor array are respectively row and column vectors and the summed currents along these columns are dot productions. Directly interfacing sensors with memristor arrays to process analogue sensory signals, known as near-sensor analogue computing, can significantly reduce a system's latency. Moreover, optoelectronic memristor devices that both detect optical stimuli and process data in-sensor have enabled ultrafast and efficient neuromorphic visual systems to be realized. To achieve similar speed and efficiency for artificial skin systems, an effective way to integrate tactile sensors with flexible memristor arrays is needed. Such a direct integration has not been achieved to date because integrating sensors into memristors can affect current convergence of the original resistive networks and eventually impair the VMM computation of the memristor array.

Thus, there is a need for systems for ultrafast responsive tactile sensing for artificial electronic skin deployable in wearable devices, prosthetic hands, robotics skins, body sensor networks and tactile internet which overcome the drawbacks of the prior art and provide fast, low power solutions. Furthermore, other desirable features and characteristics will become apparent from the subsequent detailed description and the appended claims, taken in conjunction with the accompanying drawings and this background of the disclosure.

SUMMARY

According to at least one aspect of the present embodiments, a tactile near-sensor analogue computing system is provided. The tactile near-sensor analogue computing system includes a tactile sensor array and a memristive computing array. The tactile sensor array is configured to capture data and includes a plurality of tactile sensing devices. The memristive computing array is configured to process the data and includes a plurality of memristive devices, each of the plurality of tactile sensing devices connected to one of the plurality of memristive devices.

According to another aspect of the present embodiments, an artificial skin system is provided. The artificial skin system includes a tactile sensor array and a flexible memristive computing array. The tactile sensor array is configured to capture data and includes a plurality of tactile sensing devices. The flexible memristive computing array is configured to process the data and includes a plurality of memristive devices. Each of the plurality of tactile sensing devices directly interfaces to one of the plurality of memristive devices, wherein the memristive devices directly interfacing the tactile sensing devices receive and process non-converted data from the tactile sensing devices connected thereto.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with present embodiments.

FIG. 3, comprising FIGS. 3A and 3B, depicts fabrication of devices and systems in accordance with the present embodiments, wherein FIG. 3A depicts a near-sensor analogue computing system implemented on a flexible substrate and FIG. 3B depicts a fabrication process for the near-sensor analogue computing system of FIG. 3A.

FIG. 5, comprising FIGS. 5A and 5B, depicts SEM images of a pressure sensor array with pyramidal microstructures in accordance with the present embodiments, wherein FIG. 5A depicts a portion of the pressure sensor array and FIG. 5B depicts an enlargement of a single pyramidal microstructure.

FIG. 7, comprising FIGS. 7A, 7B and 7C, depicts sensing and endurance characteristics of the piezoresistive pressure sensor array in accordance with the present embodiments, wherein FIG. 7A depicts ultrasensitive pressure-resistance sensing characteristics, FIG. 7B depicts mechanical endurance characteristics, and 7C depicts ultrasensitive sensing characteristics of an individual pressure sensor.

FIG. 9 depicts a cross-sectional transmission electron microscopy (TEM) image of an $Au/TiW/HfO_2/Au$ memristor device in accordance with the present embodiments.

FIG. 10, comprising FIGS. 10A and 10B, depicts graphs of current-voltage (I-V) curves demonstrating the robust switching behavior of the memristor in accordance with the present embodiments, wherein FIG. 10A depicts current-voltage (I-V) curves over 100 switching cycles and FIG. 10B depicts current-voltage (I-V) curves of the Au/TiW/$HfO_2$/Au memristor unit after an electroforming process to activate the bipolar resistive switching characteristics.

FIG. 12, comprising FIGS. 12A, 12B and 12C, depicts conductance change during set and reset of the memristor array in accordance with the present embodiments, wherein FIG. 12A is a graph of continuous conductance change in the memristor using a pulse height modulation method, FIG. 12B is an enlarged section of the continuous conductance change shown in FIG. 12A during a reset process, and FIG. 12C is a graph of target and programmed conductance values between 100 µS to 1 mS.

FIG. 13, comprising FIGS. 13A, 13B and 13C, depicts graphs illustrating conductance characteristics of the nine memristor devices in the memristor array in accordance with the present embodiments, wherein FIG. 13A depicts the multi-level conductance states of the nine memristor devices in the system written using pulse height modulation method, FIG. 13B depicts the linear I-V relation of the nine devices for conductance ranging from 100 µS to 1 mS, and FIG. 13C depicts the stable retention of the nine devices for conductance ranging from 100 µS to 1 mS.

FIG. 15, comprising FIGS. 15A, 15B and 15C, depicts using a fingerprint-like mold for pressure stimuli of the tactile sensor array in accordance with the present embodiments, wherein FIG. 15A depicts an original fingerprint-like mold, FIG. 15B depicts a noisy fingerprint-like mold, and FIG. 15C depicts a reading of the noisy fingerprint-like mold on the tactile sensor array where "1" represents pressure is applied and "0" represent no pressure stimulus.

FIG. 17, comprising

FIG. 18, comprising FIGS. 18A, 18B and 18C depict raw monitoring voltage mapping of pressure sensing of the fingerprint-like mold of FIG. 15B in accordance with the present embodiments, wherein FIG. 18A depicts voltage mapping of experimental results, FIG. 18B voltage mapping of simulation results, and FIG. 18C depicts software smoothed voltage mapping, FIG. 19, comprising FIGS. 19A, 19B and 19C monitoring voltage mapping of pressure sensing of the fingerprint-like mold of FIG. 15B after binarization in accordance with the present embodiments, wherein

FIG. 23, comprising FIGS. 23A and 23B, depicts illustrations of edge detection information decoded from the near-sensor analogue computing system in accordance with the present embodiments, wherein FIG. 23A depicts edge detection information decoded from experimental data and FIG. 23B depicts edge detection information decoded software.

And FIG. 26, comprising FIGS. 26A and 26B, depicting a conventional CMOS-based integrated system simulated by Cadence software implementing the near-sensor analogue system in accordance with the present embodiments, wherein

Figure 1:
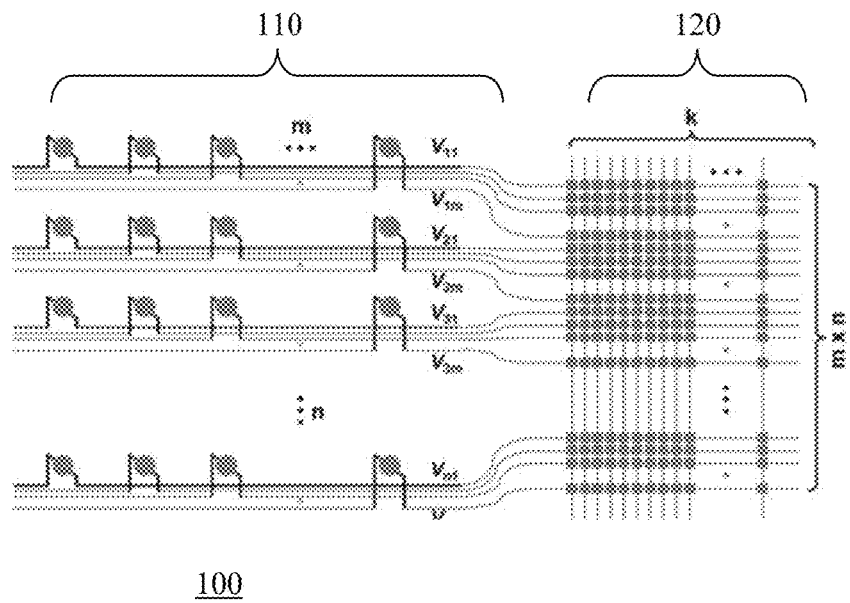
FIG. 1 depicts a schematic illustration of a near-sensor analogue computing system with a piezoresistive pressure sensor array in accordance with present embodiments.

Skilled artisans will appreciate that elements in the figures are illustrated for simplicity and clarity and have not necessarily been depicted to scale.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of present embodiments to present a near-sensor analogue computing system based on a flexible memristor array for artificial skin applications. Systems in accordance with present embodiments seamlessly integrate a tactile sensor array with a flexible hafnium oxide memristor array to simultaneously sense and compute raw analogue pressure signals without interface electronics. A system in accordance with the present embodiments can provide, among other solutions, real-time noise reduction and edge detection of tactile stimuli, and one sensing-computing operation of the system in accordance with the present embodiments advantageously takes about 400 ns and consumes on average 1000 times less power than a conventional interface electronic system. Accordingly, systems in accordance with the present embodiments provide near-sensor analogue computing solutions for ultrafast and energy-efficient large-scale artificial skin systems which can enable unprecedented tactile internet applications in prosthetics, robotics, and human-machine interactions.

While conventional artificial skin systems rely on front-end interface electronics which typically perform redundant data transfer and analogue-to-digital conversions for decision-making causing long latency, system in accordance with the present embodiments have an integration architecture without analogue-to-digital conversion that enables near-sensor analogue computing for ultrafast artificial skin applications. By integrating a pyramidal pressure sensor array with a flexible gold (Au)/titanium tungsten (TiW)/hafnium oxide (HfO$_2$)/Au memristor array, the architecture in accordance with the present embodiments can simultaneously sense and process tactile stimuli without any conversion circuits.

The memristor array is flexible (bendable to 5 mm), reliable and displays continuous conductance states for analogue computing. Fabricated artificial skin systems with the near-sensor analogue computing architecture in accordance with the present embodiments can execute real-time sensing and computing tasks, such as noise reduction and edge detection of pressure stimuli. One sensing-computing operation of the fabricated artificial skin systems advantageously takes only 400 ns with an interval time of 1 µs, translating to a processing capacity of one million operations per second. The maximum static average power consumption for tasks such as noise reduction (2 µW) and edge detection (7.84 µW) were more than three orders of magnitude lower than conventional interface electronic systems (8.24 mW), thus demonstrating that obtaining ultrafast and energy-efficient artificial skin systems is possible using near-sensor analogue computing systems in accordance with the present embodiments, potentially enabling a vast series of robust human-machine interactions.

Referring to FIG. 1, a schematic illustration 100 depicts a near-sensor analogue computing system in accordance with present embodiments. As shown in the schematic 100, the near-sensor analogue computing architecture for artificial skin in accordance with the present embodiments includes an m×n piezoresistive tactile sensor array 110 for sensing tactile stimuli directly interfacing without any conversion circuits with an (m×n)×k memristor computing array 120 for data processing. The piezoelectric-based sensor array 110 can spontaneously provide continuous voltage stimuli as analogue sensory input to respond to multi-level sensor stimuli. Each sensor unit of the sensor array 110 is connected in series with a memristor device of the memristor computing array 120. Each memristive device of the memristor computing array 120 may be a resistive switching unit, a phase change memory, a magnetoresistive switching unit, or a ferroelectric switching unit.

In the system, a pre-bias voltage vector ($V_{p11}$-$V_{pnm}$) through the sensor array 110 is modulated by pressure stimuli and converted into a new analogue voltage vector ($V_{11}$-$V_{nm}$), which is directly fed into the memristor array 120 as input. These new analogue voltages act as a row vector, and the conductance of the memristor array 120 acts as column vectors. The dot production of the row and column vectors are obtained through the summed currents along columns based on Ohm's law and Kirchhoff's current law, realizing a vector-matrix multiplication (VMM) operation.

Figure 2:
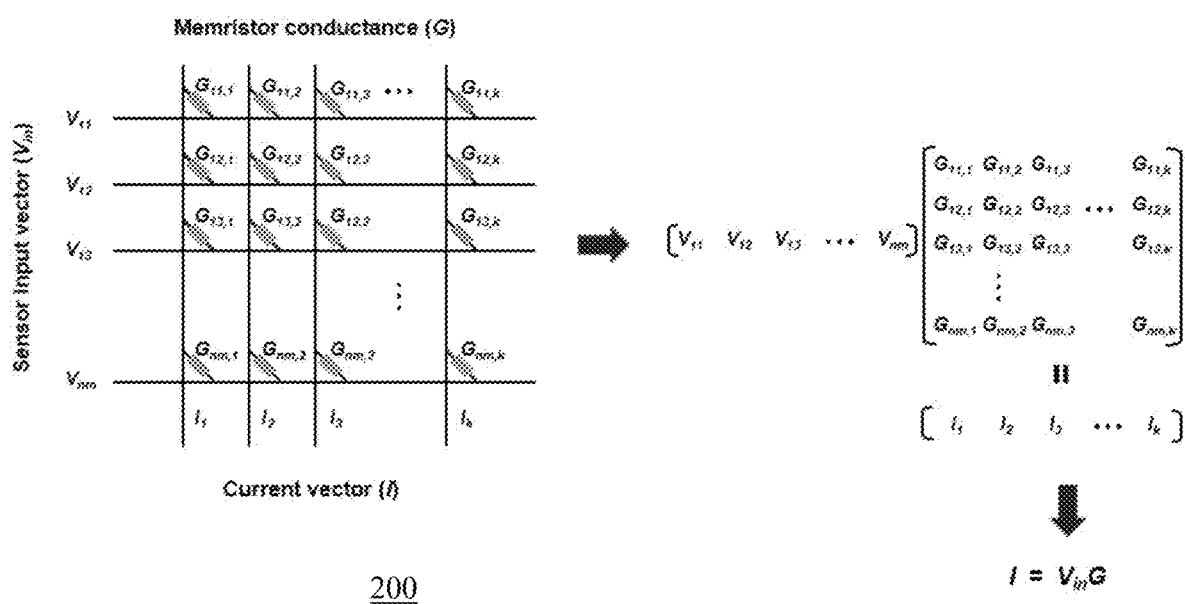
FIG. 2 depicts a schematic diagram of implementation of vector-matrix multiplications (VMMs) in the memristor array of the near-sensor analogue computing system of FIG. 1 in accordance with the present embodiments.

FIG. 2 depicts a schematic diagram 200 of VMM implementation in the memristor array 120 in accordance with the present embodiments. The voltage ($V_{11}$, $V_{12}$, . . . , $V_{nm}$) carrying pressure information is regarded as a row vector ($V_{in}$), and the reconfigurable conductance of memristor array ($G_{11,i}$, $G_{12,i}$, . . . , $G_{nm,i}$) acts as column vectors, where, i ranges from 1 to k. Based on the Ohm's law and Kirchhoff's law, the dot production of one row vector and one column vector can be achieved through the summed current along the column, which represents a specific kind of computation functionality. All summed currents ($I_1$, $I_2$, . . . , $I_k$) along the k columns can be achieved in parallel, indicating that the system can simultaneously implement k kinds of computation functionalities. Each summed current along a column could represent a specific computation task, indicating that the system can implement k kinds of computation functionality in parallel. Accordingly, all memristor devices can be programmed to specific conductance values within a certain range according to the required computation tasks.

Figure 3A:
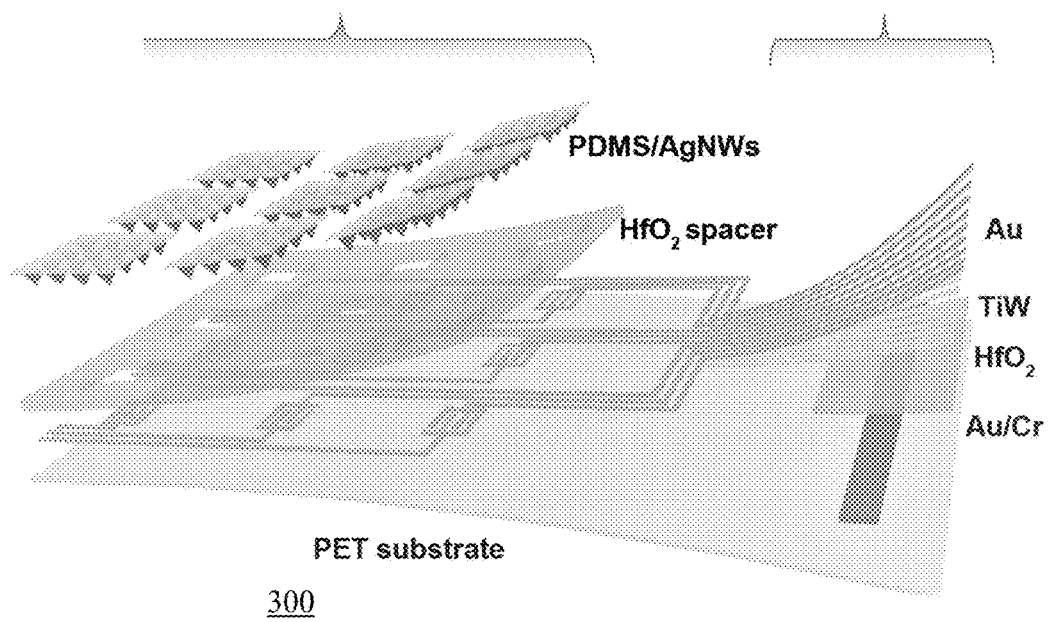
Figure 3B:
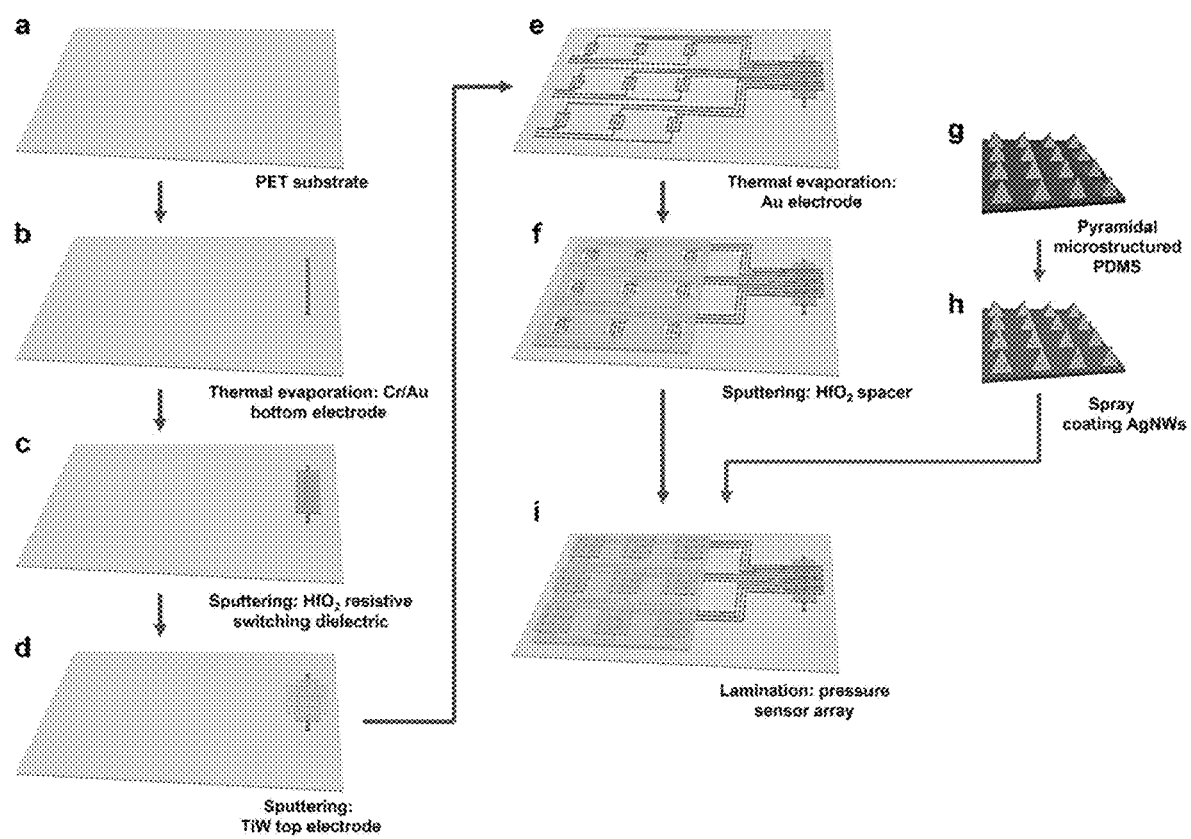

Referring to FIGS. 3A and 3B, illustrations 300, 350 depict fabrication of devices and systems in accordance with the present embodiments. The schematic illustration 300 depicts a near-sensor analogue computing system in accordance with the present embodiments implemented on a flexible substrate which consists of a 3×3 pyramidal pressure sensor array 310 and a (9×1)×1 memristor array 320.

The schematic illustration 350 depicts microfabrication and transfer processes used to integrate the 3×3 piezoresistive pressure sensor array 310 with the (9×1)×1 memristor array 320. The sensor array 310 and the memristor array 320 were seamlessly integrated onto a flexible polyethylene terephthalate (PET) using microfabrication processes as shown in the schematic illustration 350. A crossbar memristor array was fabricated by successively depositing 5 nm Cr, 60 nm Au, 9 nm HfO$_2$, 30 nm TiW, and 70 nm Au. The HfO$_2$ and TiW films were grown using sputtering processes, whereas Cr and Au thin films were deposited via thermal evaporation. The 70 nm Au electrodes of the memristor array 320 were physically connected with interdigital electrodes (Au) of the tactile pressure sensor array 310 to provide a near-sensor analogue computing system in accordance with the present embodiments.

Figure 4:
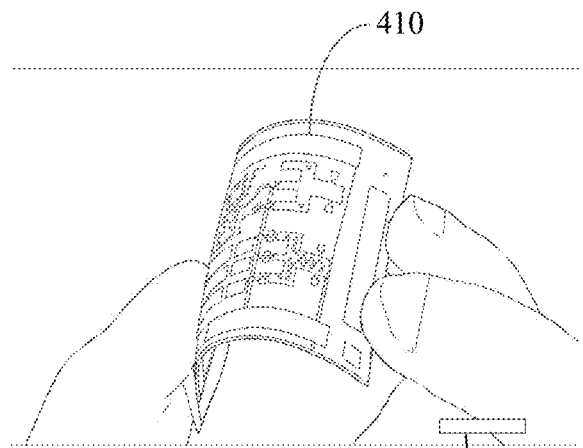
FIG. 4 depicts a photograph of an artificial skin system with a near-sensor analogue computing architecture in accordance with the present embodiments.

FIG. 4 is a photograph 400 of the fabricated artificial skin system 410 with a near-sensor analogue computing architecture in accordance with the present embodiments, where the scale bar 420 is 1 cm. As can be seen from the photograph 400, the artificial skin system 410 fabricated in accordance with the present embodiments is highly flexible which advantageously enables formation of the artificial skin into many different geometric shapes, such as mimicking the shape of a finger.

Figures 5A, 5B:
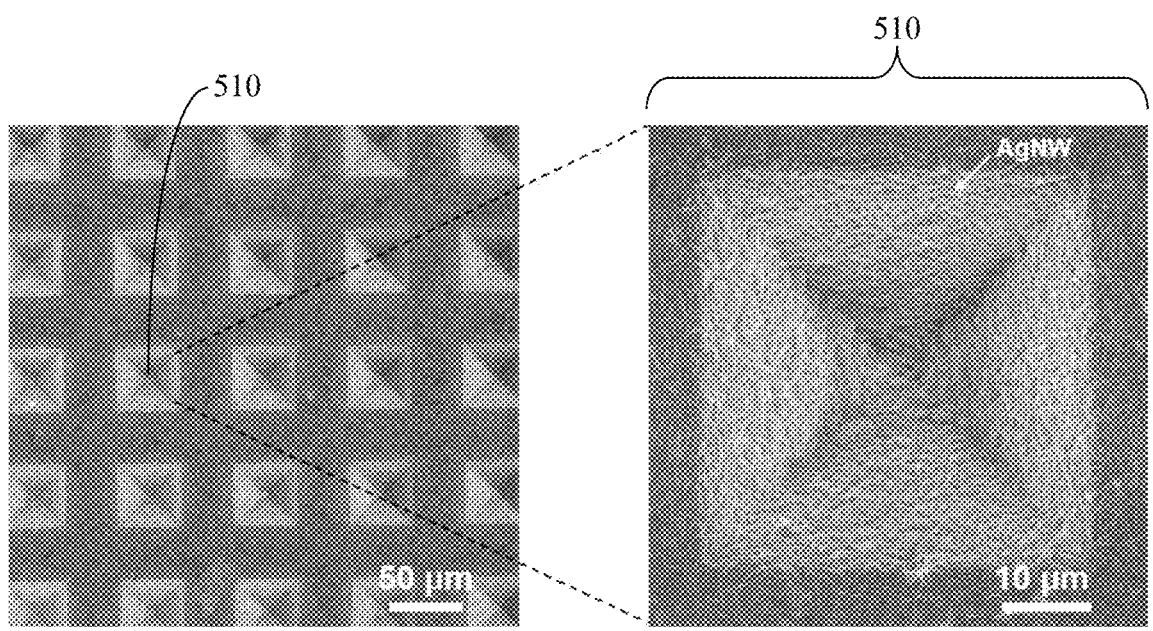
Figure 6:
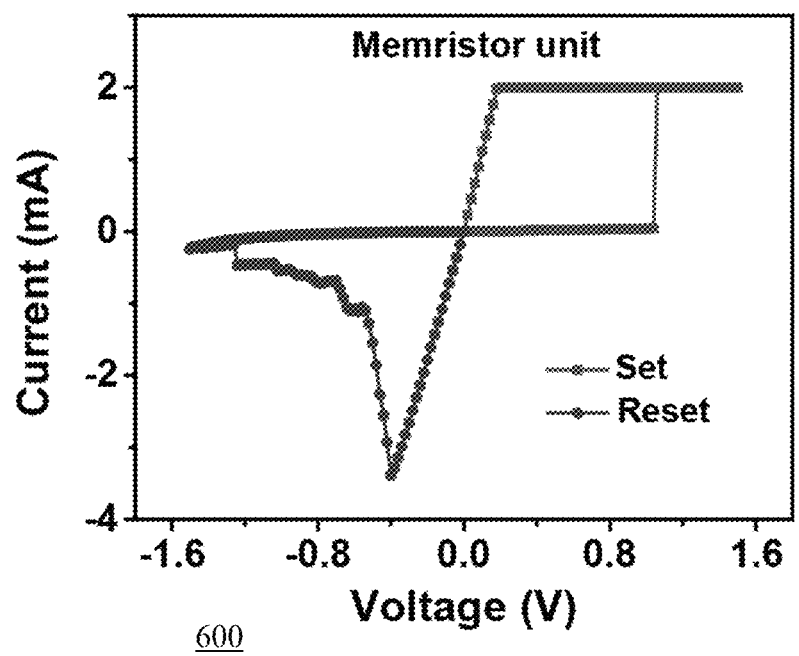
FIG. 6 depicts a current-voltage (I-V) graph of a $HfO_2$-based memristor unit in accordance with the present embodiments.

While fabrication of the piezoresistive sensor array 310 is shown in the illustration 350, SEM images 500, 550 of FIGS. 5A and 5B depict a single pyramidal microstructured polydimethylsiloxane (PDMS) elastomer 510 coated with silver nanowires (AgNWs) in accordance with the present embodiments. The AgNWs (60 nm×10 µm, 0.5 wt % in isopropyl alcohol) and PDMS were purchased from Sigma- Aldrich, Inc. of St. Louis, Missouri, USA. First, silicon masters with pyramidal microstructure arrays were fabricated using a wet etching process, and then the masters underwent a hydrophobication treatment. The size of the pyramidal pattern was 40×40 µm². PDMS precursors (elastomer and crosslinker in a weight ratio of 10:1) were spin-coated onto the silicon master at 500 r.p.m. for 60 s, and then cured in an oven at 60° C. for eight hours. After peeling off, the pyramidal PDMS substrate was further treated by oxygen plasma (5 mbar, 70 W for 2 min). A diluted AgNW solution was then spray-coated onto the pyramidal PDMS substrate which was placed on a hotplate at 80° C. Finally, the AgNW-coated pyramidal PDMS was cut into individual units with the size of 2.5×2.5 mm². These individual units were laminated onto the interdigital Au electrodes to construct the tactile pressure sensor array 310 for physical connection with the memristor array 320 to provide the near-sensor analogue computing system in accordance with the present embodiments Referring to FIG. 6, a graph 600 depicts a current-voltage curve of set and reset switching characteristics of the HfO₂-based bipolar resistive switching units of the flexible memristor array 320. The top Au electrodes of the memristor array 320 are physically connected to the interdigital electrodes of the pressure sensor array 310 to advantageously eliminate signal conversion in accordance with the present embodiments.

Figure 7A:
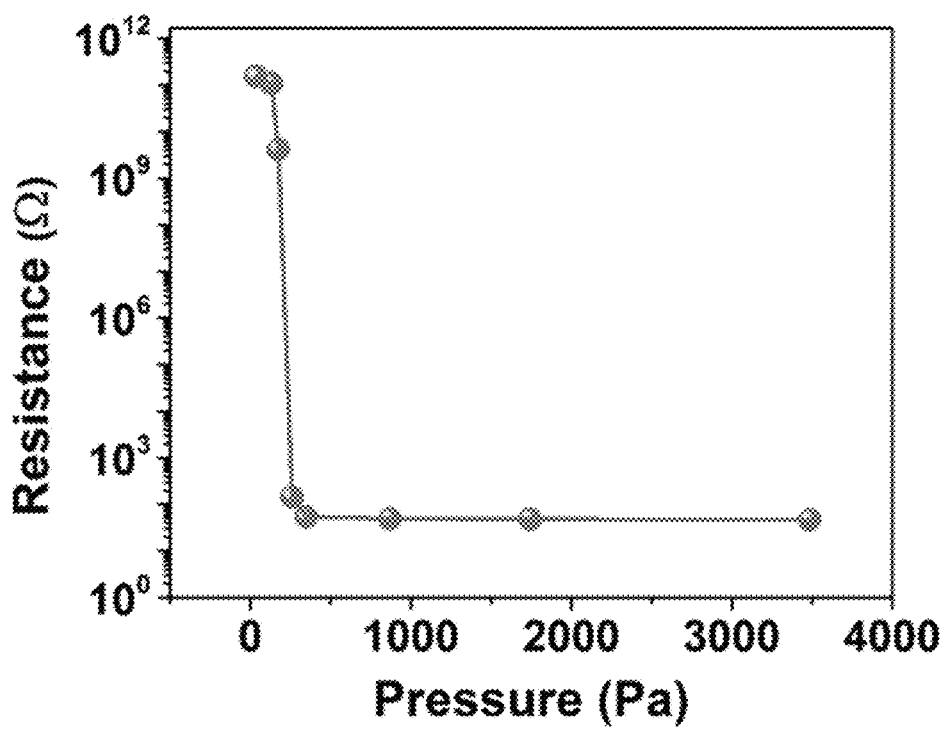
Figure 7B:
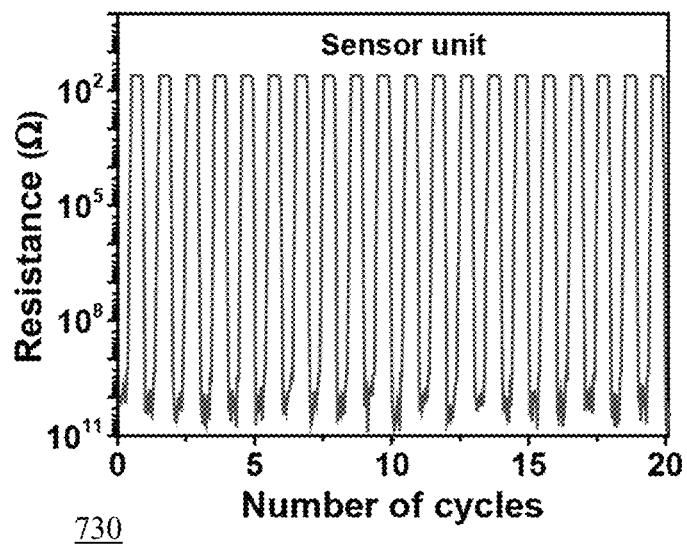
Figure 7C:
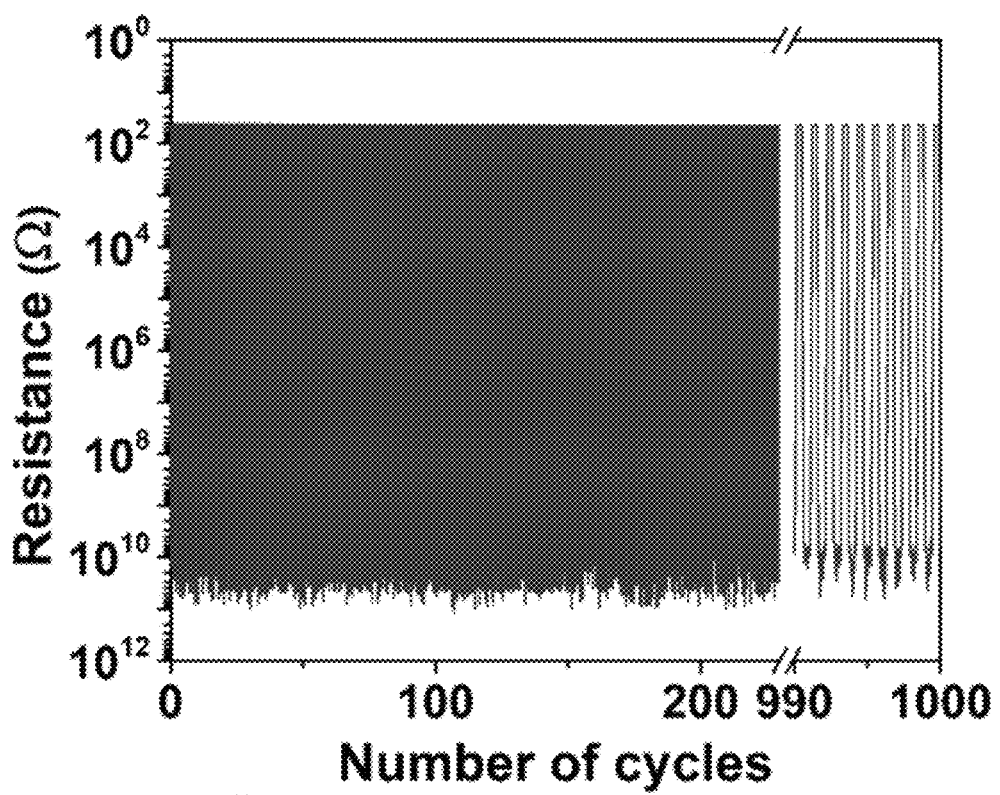
Figure 8:
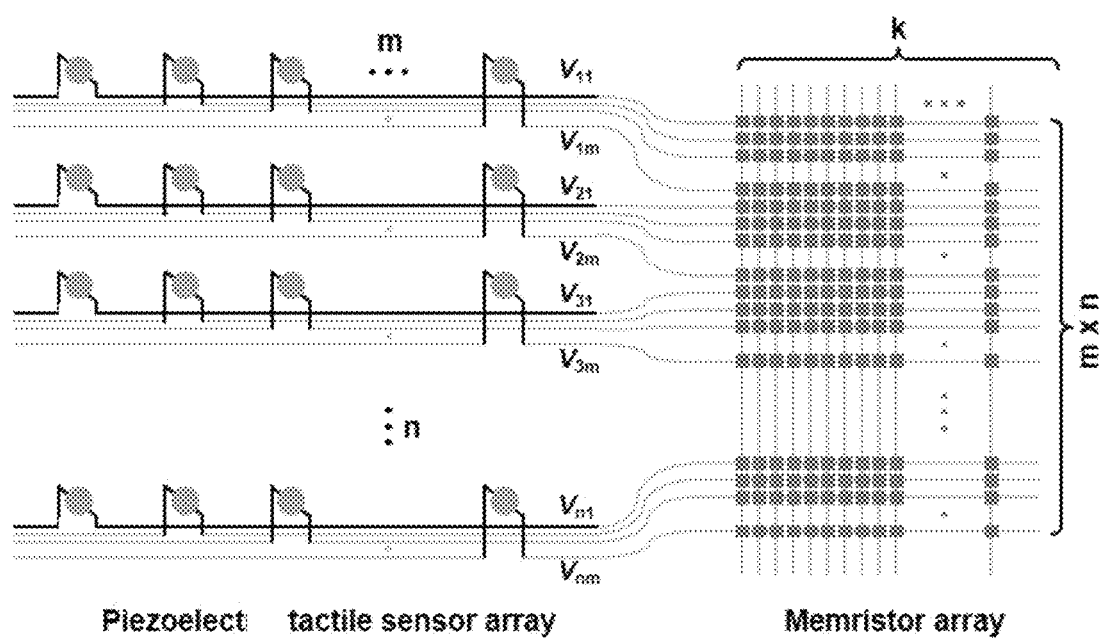
FIG. 8 depicts a schematic illustration of a near-sensor analogue computing system with a piezoelectric pressure sensor array in accordance with present embodiments.

The piezoresistive pressure sensor array 310 in accordance with the present embodiments displays ultrasensitive characteristics with a high OFF-state (~$10^{10}$ Ω) under no pressure and a low ON-state (~40 Ω) under a 500 Pa pressure as shown in graphs 700, 730 of FIGS. 7A and 7B. Restricting the piezoresistive sensors to two distinct (OFF and ON) resistance states is necessary for pressure information from the sensor array to be delivered to the memristor array without affecting the VMM operation of the original memristors. Such bistable sensory signals are easily achieved with the pyramidal microstructured sensors in accordance with the present embodiments. The piezoresistive sensor array also displays reliable sensing behaviour up to 1000 continuous cycles as shown in a graph 460 of FIG. 7C. Alternatively, replacing the piezoresistive units with tactile piezoelectric sensors as shown in the schematic illustration 800 of FIG. 8 can send continuous analogue sensory signals into the memristor array without affecting its VMM operation.

In the near-sensor analogue computing system in accordance with the present embodiments, correct transmission of the pressure information from the piezoresistive sensor array to the memristor array is a critical challenge. The introduction of additional sensors should have little impact on the VMM operation of the memristor array and the near-sensor analogue computing system can be considered equivalent to a pure resistive network where each cross point consists of one sensor and one memristor in series.

For simplification, it is supposed that m=n=3 and k=1 to evaluate the effect of the sensor array on the calculated results. The real monitoring current (I) along the column in the sensor-memristor network is $$I = \frac{V_{p1}}{R_P + R_1} + \frac{V_{p2}}{R_P + R_2} + \cdots + \frac{V_{p8}}{R_P + R_8} + \frac{V_{p9}}{R_P + R_9} \quad (1)$$

where R is the resistance value of the memristor unit, $R_p$ is the resistance value of the sensor unit. The ideal calculated result (I') is $$I' = \frac{V_{S1}}{R_1} + \frac{V_{S2}}{R_2} + \cdots + \frac{V_{S8}}{R_8} + \frac{V_{S9}}{R_9} \quad (2)$$

where $V_S$ is the pressure signal of the sensor unit. The error between the ideal and real cases is $$I_{error} = I' - I = \left(\frac{V_{S1}}{R_1} - \frac{V_{p1}}{R_P + R_1}\right) + \cdots + \left(\frac{V_{S9}}{R_9} - \frac{V_{p9}}{R_P + R_9}\right) \quad (3)$$

In accordance with one aspect of the present embodiments, the pressure sensors are restricted to two distinct resistance values: an ON-state (~40 Ω) under pressure and an OFF-state (~$10^{10}$ Ω) under no pressure. The pre-bias voltages $V_p$ are 0.1 V or −0.1 V. The resistance value R in the VMM operations is ~kΩ for the commonly used memristor unit including memristor units used in systems in accordance with the present embodiments. Under no pressure, the pressure sensor units show insulating states, resulting in $$\frac{V_p}{R_P + R} \approx 0 \text{ and } V_S \approx 0.$$

The error term $$\left(\frac{V_S}{R} - \frac{V_p}{R_P + R}\right)$$

is also zero for the sensor units without applying pressure. Hence, only the error terms of sensor units under pressure need to be considered in the overall error.

The pressure sensor units under pressure show highly conductive states with low resistance value, resulting in $V_S \approx V_p$. Assuming that sensor units (i, . . . , j) are under external pressures, the resultant error between the ideal and real cases is $$I_{error} = \quad (4)$$
$$I' - I = \left(\frac{V_{pi}}{R_i} - \frac{V_{pi}}{R_P + R_i}\right) + \cdots + \left(\frac{V_{pj}}{R_j} - \frac{V_{pj}}{R_P + R_j}\right) = \frac{R_P V_{pi}}{(R_P + R_i)R_i} + \cdots +$$
$$\frac{R_P V_{pj}}{(R_P + R_j)R_j} (R_P \ll R_i, \ldots, R_j) \approx \frac{R_P V_{pi}}{R_i \times R_i} + \cdots + \frac{R_P V_{pj}}{R_j \times R_j} \approx 0$$

Hence, the error is almost negligible for a small array.

Figure 10B:
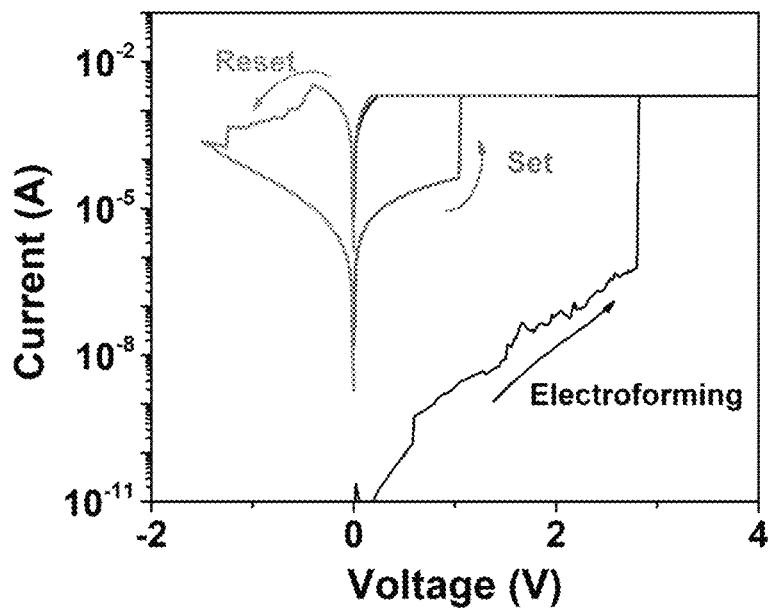
Figure 11:
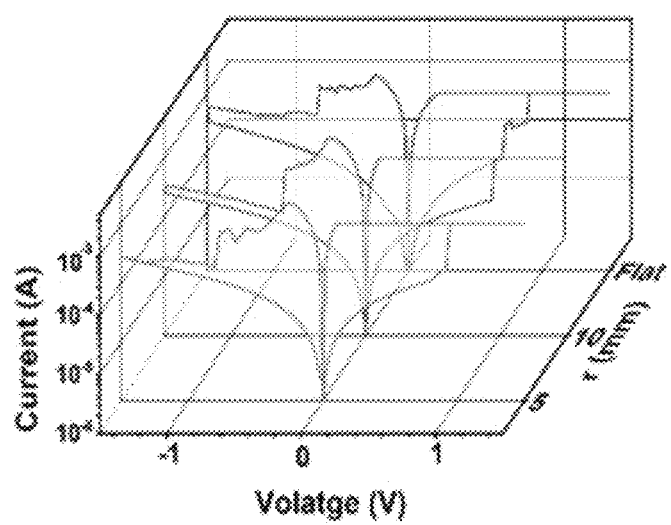
FIG. 11 depicts a plot of resistive switching characteristics of the memristor device under flat and bent states in accordance with the present embodiments.

Because the flexible memristor array is a critical component for computation, it must display reliable and reproducible switching behaviors, multi-level and stable conductance states, and linear current-voltage (I-V) relations. To achieve this, multiple stacked thin-films of Au/TiW/HfO₂/Au layers were used to build up the memristor units, as shown by a cross-sectional transmission electron microscopy (TEM) image 900 in FIG. 9. The fabricated memristor device displayed one hundred reproducible DC resistive switching cycles after an electroforming process with a voltage of ~2.8 V to activate the bipolar resistive switching characteristics as shown in the current-voltage (I-V) curves of the graphs 1000 and 1050 of FIGS. 10A and 10B, demonstrating a reliable, robust electrical switching behavior. The device is also highly flexible and showed no deterioration in performance when bent at a radius of 5 mm and 10 mm as shown in the three-dimensional plot 1100 of FIG. 11.

Figure 12A:
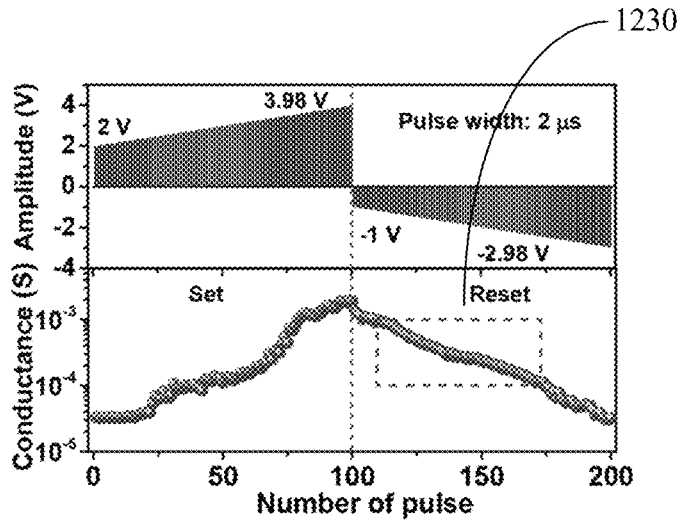
Figure 12B:
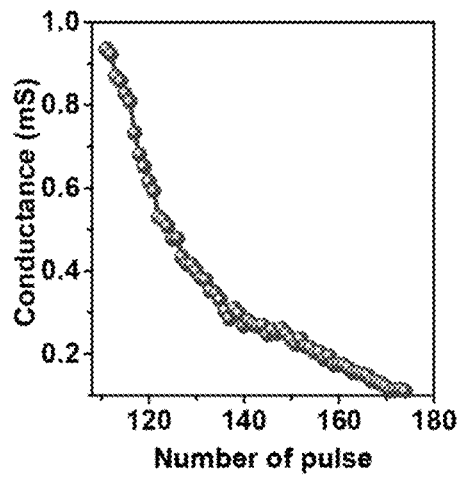

Using a pulse amplitude modulation method, the conductance of the memristor could be written to an arbitrary value between 30 µS to 2 mS. The graph 1200 of FIG. 12A plots the continuous conductance change in the memristor using a pulse with a pulse width of 2 µs and a pulse height of 2 V to 3.98 V for the Set process and a pulse height of −1 V to −2.98 V for Reset process. It can be seen form the graph 1200 that the conductance in both the Set and the Reset processes well covers the requirements (100 µS to 1 mS) for analogue computing in the system in accordance with the present embodiments. The continuous conductance change is more easily obtained in the Reset process using pulse height modulation as seen in the enlarged section 1230 of the continuous conductance change during Reset process in FIG. 12B.

Figure 12C:
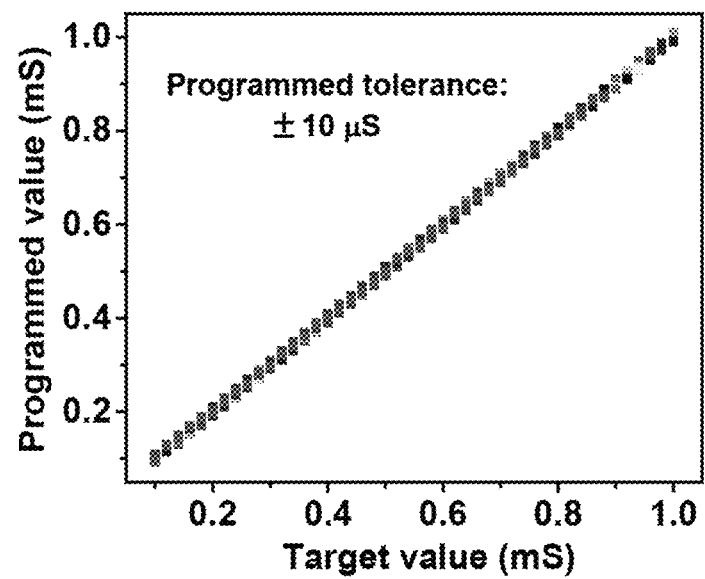

To evaluate the programmed performance, the initial difference between target conductance values and experimentally programmed values of the responsive memristor was defined as a writing error. When the writing tolerance was set to ±10 µS, the programmed conductance in the Reset processes showed a linear relationship with the target conductance value over values between 100 µS to 1 mS for each resistance state as shown in the graph 1260 of FIG. 12C.

Figure 13A:
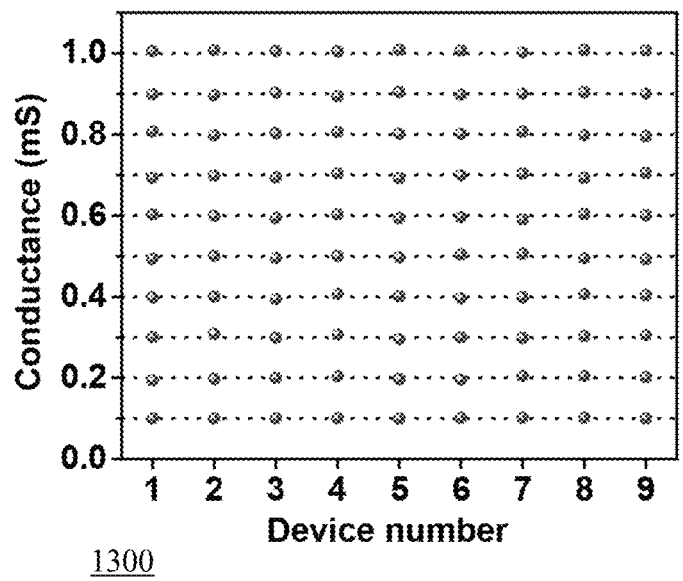
Figure 13B:
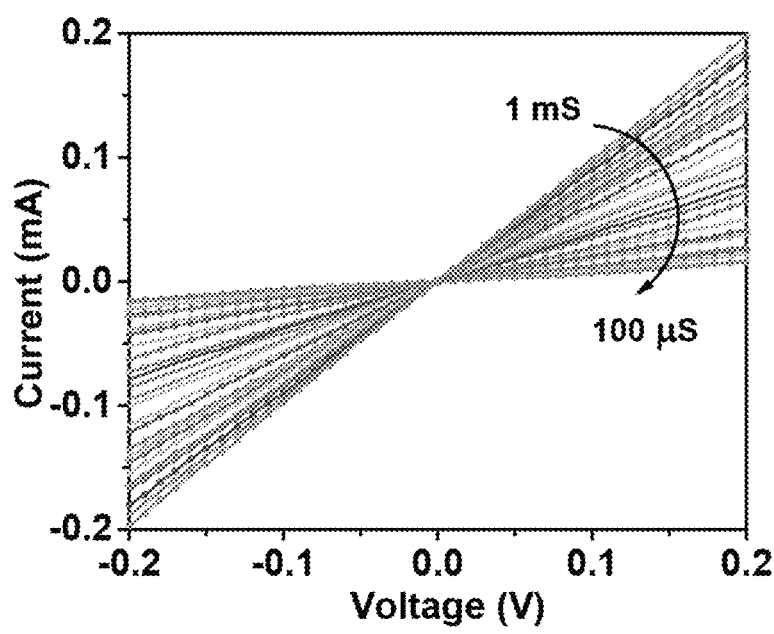
Figure 13C:
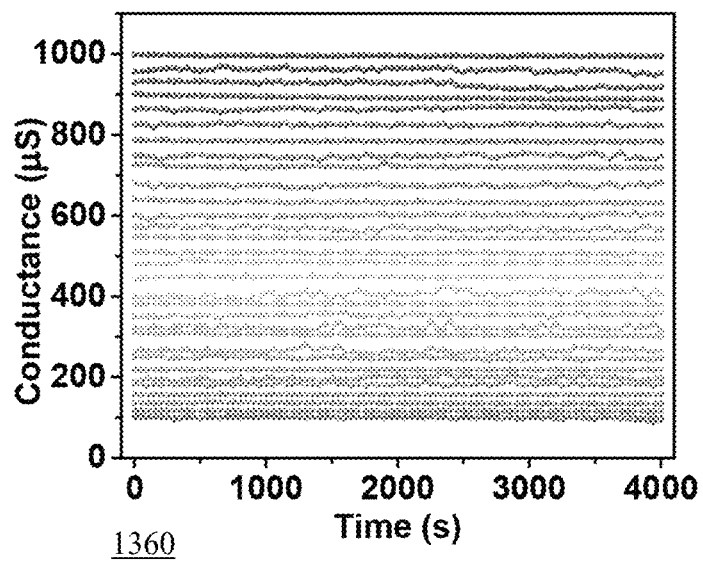

Referring to FIGS. 13A, 13B and 13C, the graphs 1300, 1330, 1360 illustrate conductance characteristics of the nine memristor devices in the memristor array in accordance with the present embodiments. The graph 1300 depicts the multi-level conductance states of the nine memristor devices the pulse height modulation method to write the nine memristor devices in the system to achieve multi-level conductance states from 100 µS to 1 mS. For this range of conductance, the I-V relation of these memristor units was almost linear as shown int eh graph 1330, the almost linear I-V relation being critical for accurate analogue computing. The conductance of the nine units in the array were further measured with read voltage of 0.1 V for more than 4000 seconds with no remarkable state drift observed as shown in the graph 1360, demonstrating the units are stable and reliable. The impact of the small fluctuations on the summed current over the nine memristors during the VMM operation was negligible.

Figure 14:
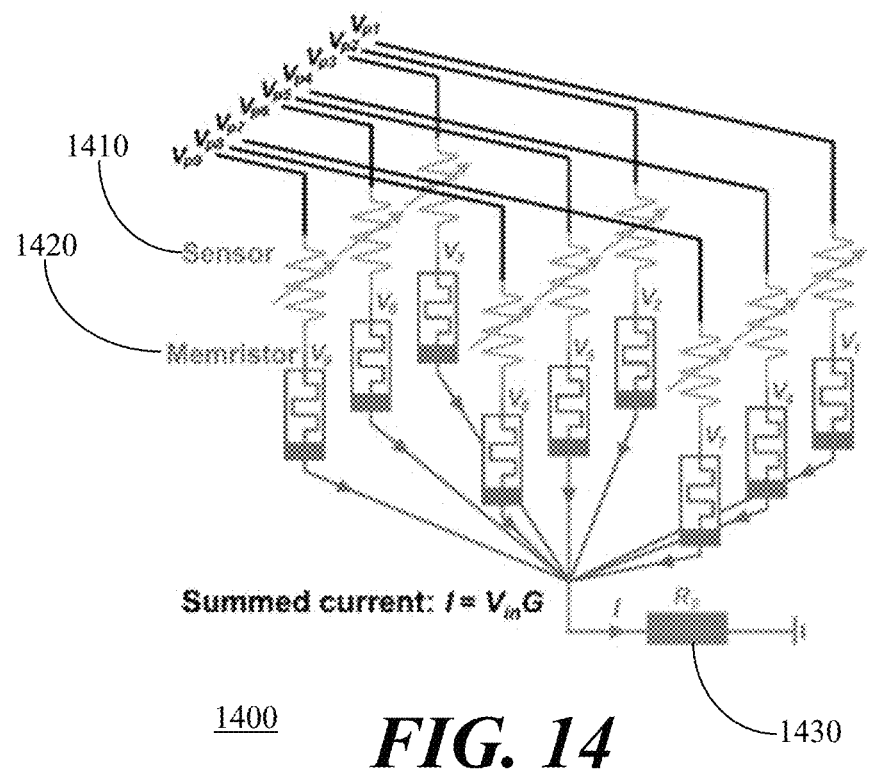
FIG. 14 depicts a schematic illustration of a system configuration for the averaging filter and the implementation of vector-matrix multiplication (VMM) of an artificial skin system in accordance with the present embodiments to measure real-time sensing and noise reduction of pressure stimuli.

The artificial skin system in accordance with the present embodiments was used to monitor pressure stimuli and remove noise signals induced by contaminated objects or improper contact in real-time. For noise reduction, the memristor array was configured as a 3×3 averaging filter by programming all memristor units to a fixed conductance state. In the experiment, the conductance of all memristor units (G) was set to 111 µS, and the pre-bias voltage pulses ($V_{p1}$-$V_{p9}$) applied to all the pressure sensors were 0.1 V. The system configuration for the averaging filter and the implementation of vector-matrix multiplication (VMM) is shown in the schematic illustration 1400 of FIG. 14 where the pre-bias voltage pulses ($V_{p1}$-$V_{p9}$) are applied to the sensors 1410 of the sensor array, which directly interface with the memristors 1420 of the memristor array. A monitoring resistor ($R_0$) 1430 was connected in series with the column of the memristor array to read out the summed current (I). When one pixel in the sensor array is applied with an external pressure >500 Pa, the resistance value of the sensor will be very low (~40 Ω) due to its ultrasensitive characteristics as shown in the graph 700 (FIG. 7A). The intermediate voltage between the sensor and the corresponding memristor unit is approximated to the applied pre-bias voltage of 0.1 V. When no external pressure is applied, the intermediate voltage is approximated to 0 V due to the high OFF-state of the pressure sensor. As a result, the system can transduce the pressure stimuli through the sensor array into the input voltage vector ($V_1$-$V_9$) of the memristor array.

Figure 15A:
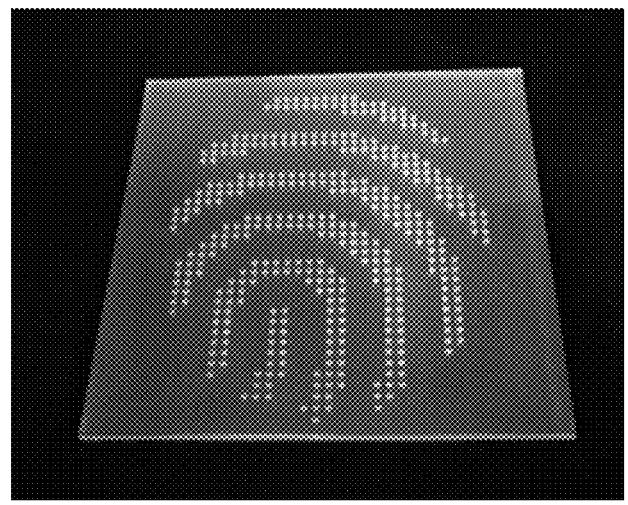
Figure 15B:
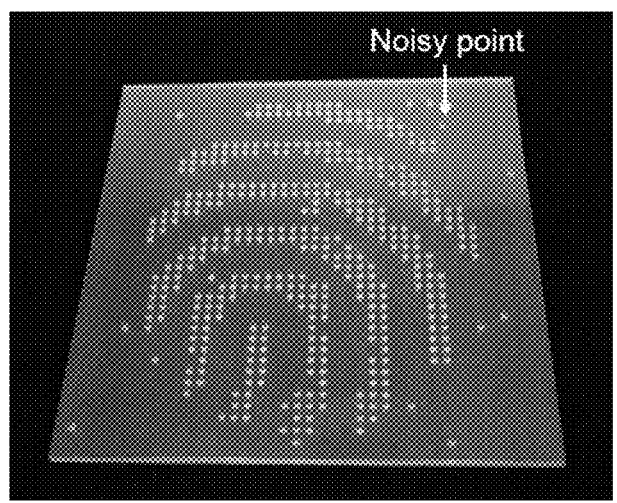
Figure 15C:
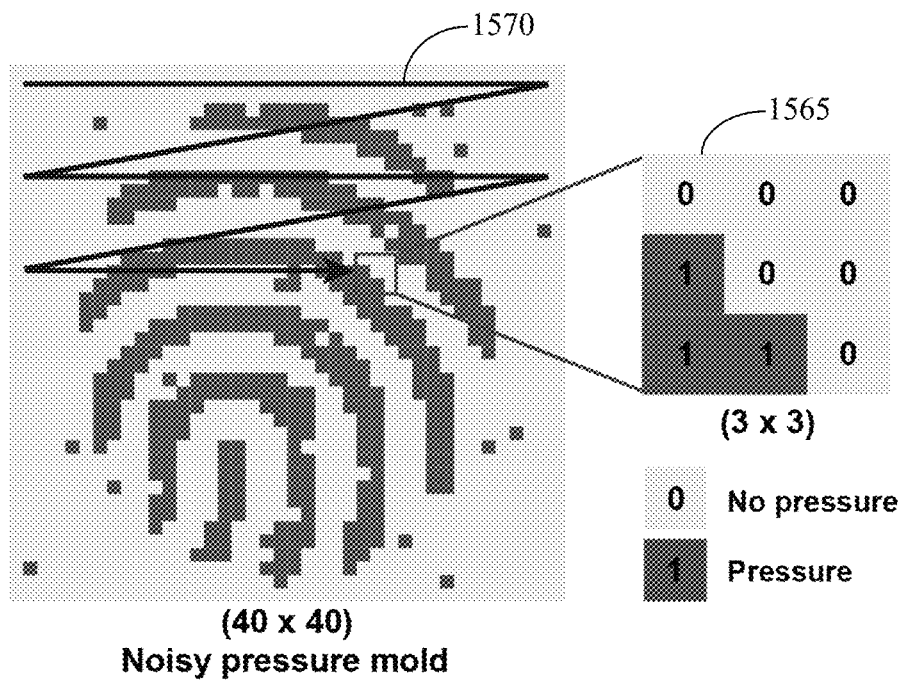

A rigid fingerprint-like mold (40×40 pixels) with noise points was fabricated to be used as pressure stimuli using three-dimensional (3D) printing technology where the illustration 1500 of FIG. 15A depicts an original fingerprint-like mold and an illustration 1530 of FIG. 15B depicts a noisy fingerprint-like mold. The 3×3 tactile sensor array in accordance with the present embodiments was pressed onto the noisy fingerprint-like mold as pressure stimuli and the reading is shown in an illustration 1560 of FIG. 15C. Each time the 3×3 tactile sensor array is pressed onto the mold, a set of 3×3 pixels pressure information is obtained as shown in the magnified view 1565 (where "1" represents pressure is applied and "0" represent no pressure stimulus) and fed into the memristor array, which generates a single pixel that forms the new fingerprint pattern. To process the entire fingerprint pattern for noise reduction, the tactile sensor array is pressed across the whole mold in the direction of the arrow 1570 with a stride of one.

Figure 16:
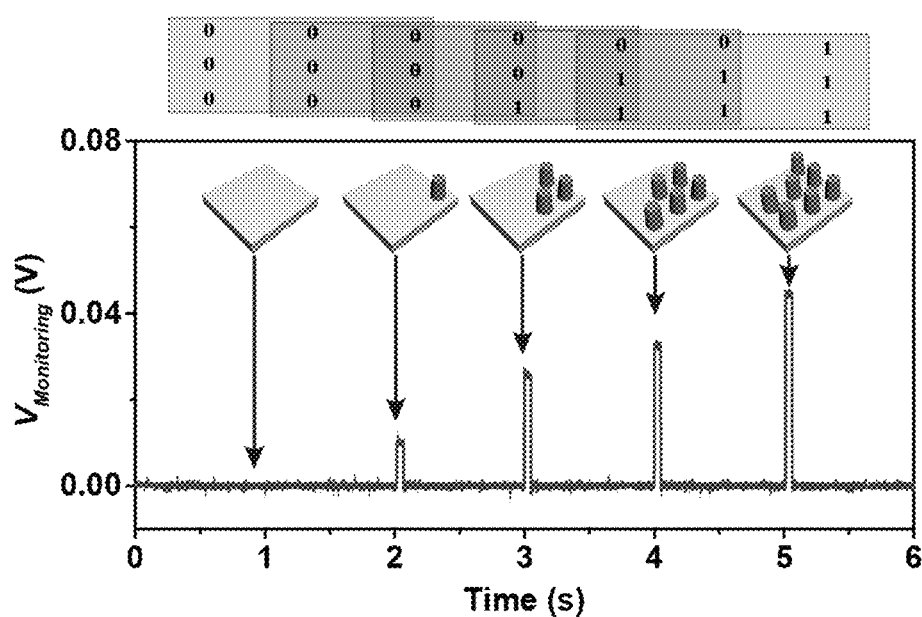
FIG. 16 depicts an illustration of several different monitoring voltages ($V_{Monitoring}$) generated under different pressure stimuli in accordance with the present embodiments.
Figure 17A:
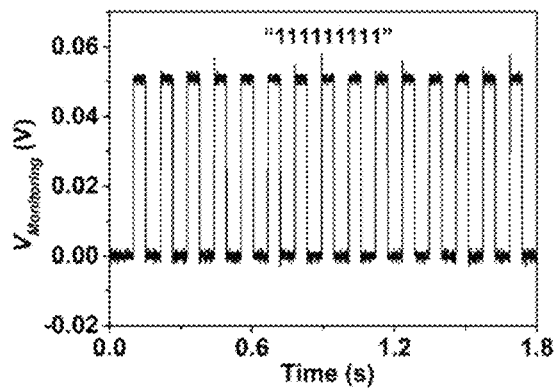
FIGS. 17A to 17J, depicts ten graphs of the monitoring voltage ($V_{Monitoring}$) as a function of pressure stimuli applied by sub-molds (3×3 pixels) in accordance with the present embodiments wherein the "1" represents applying a pressure stimulus in the pixel and the "0" represents no pressure stimulus in the pixel.
Figure 17B:
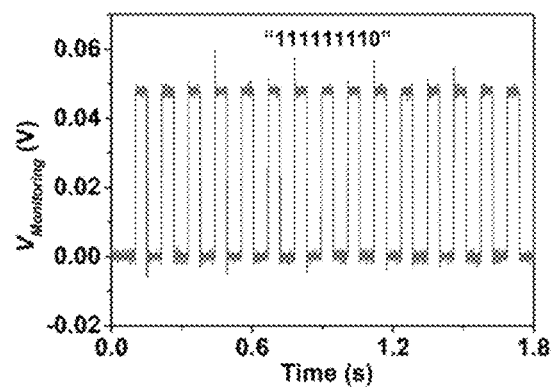
Figure 17C:
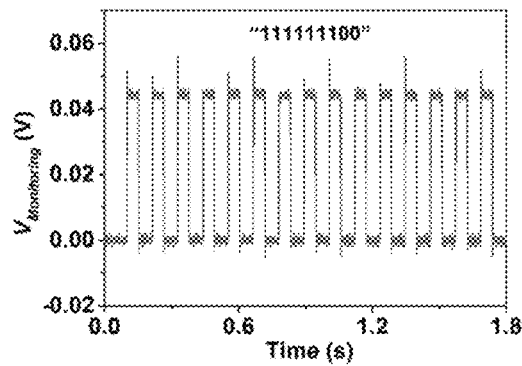
Figure 17D:
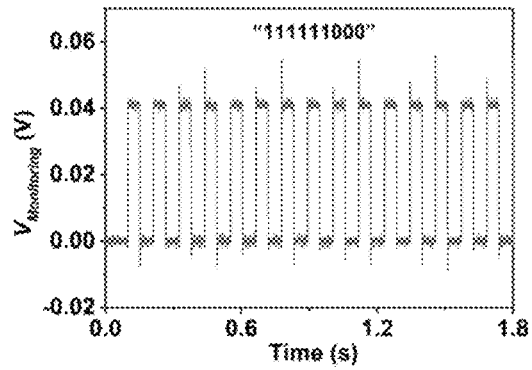
Figure 17E:
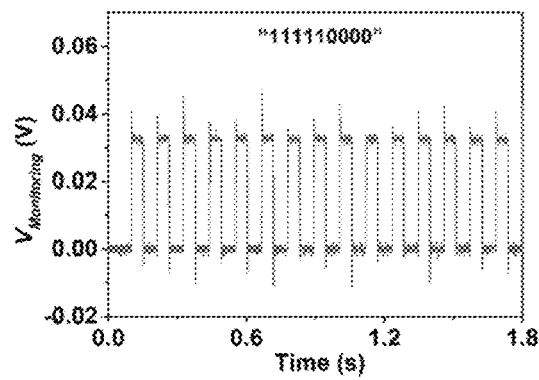
Figure 17F:
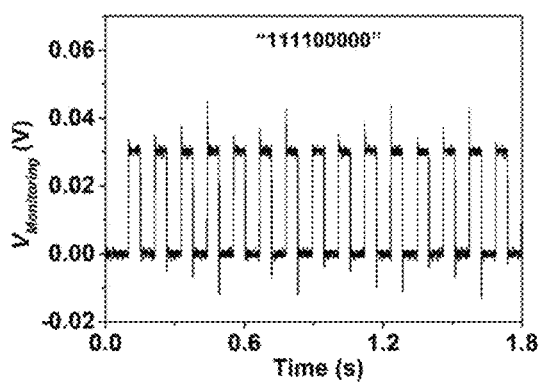
Figure 17G:
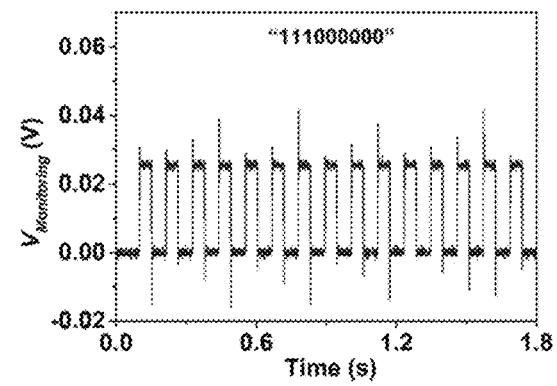
Figure 17H:
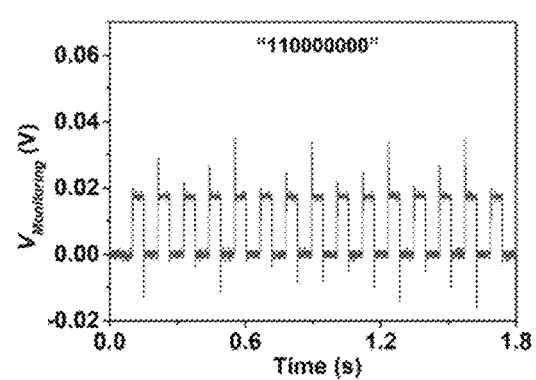
Figure 17I:
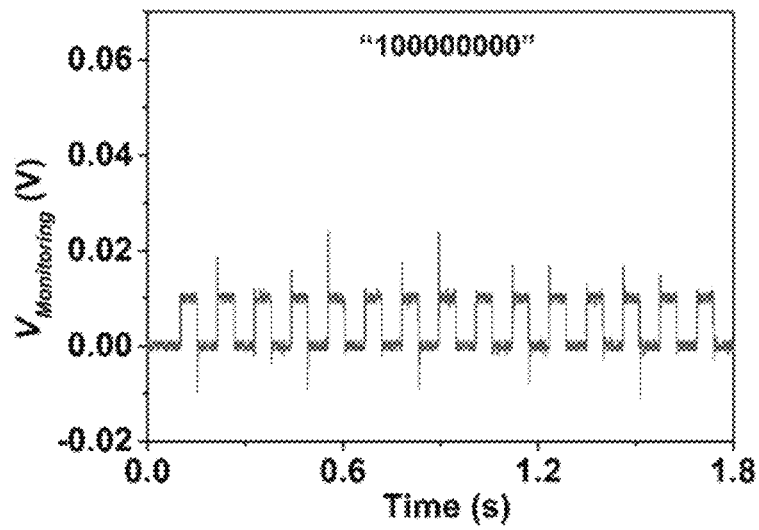
Figure 17J:
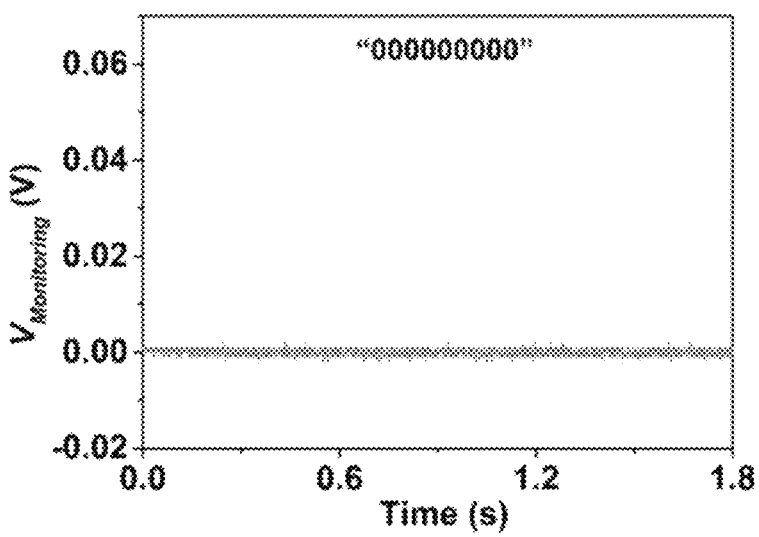

The resulting 3×3 pixels pressure information sensed by the sensor array causes a voltage change across $R_0$ that is connected to the memristor array. The monitoring voltage ($V_{Monitoring}$) represents the summed current I, which forms one pixel of the new fingerprint pattern after processing by the memristor array. An illustration 1600 of FIG. 16 depicts several typical $V_{Monitoring}$ that are generated when the tactile sensor array in accordance with the present embodiments detects different patterns on the fingerprint mold. For instance, when the sensor array is pressed onto seven solid pillars, the generated $V_{Monitoring}$ is about 0.043 V. The experimentally generated value slightly deviates from the simulated value of 0.039 V, which is attributed to the writing error of the conductance of the memristors and the resistance of the interconnection lines. This deviation did not affect the final calculated results significantly. Depending on the pressure sensed by each sensor in the tactile sensor array, $V_{Monitoring}$ ranged from 0 to 0.05 V as shown in the ten graphs of FIGS. 17A to 17J, wherein the "1" represents applying a pressure stimulus in the pixel and the "0" represents no pressure stimulus in the pixel.

Figures 18A, 18B, 18C:
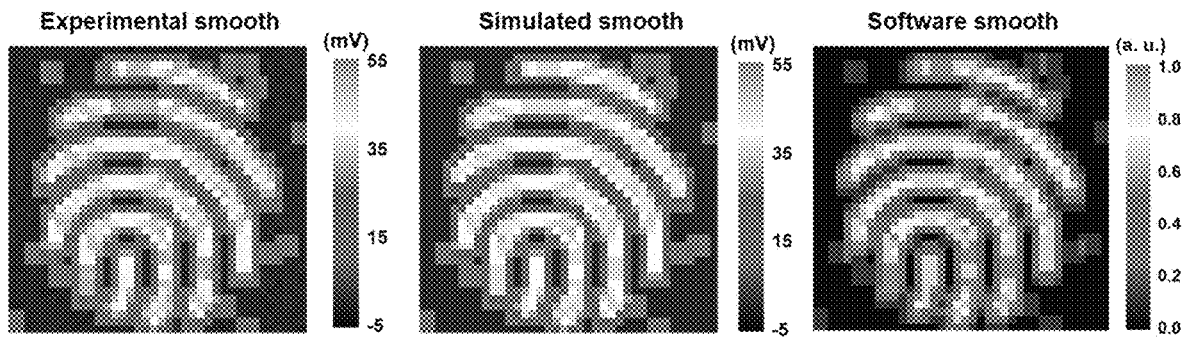
Figures 19A, 19B, 19C:
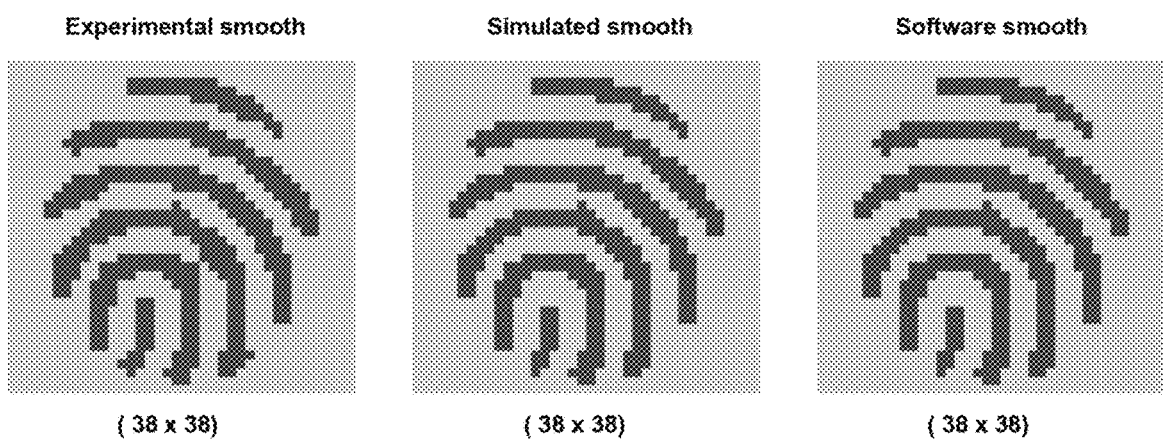
FIG. 19A depicts voltage mapping of experimental results, FIG. 19B voltage mapping of simulation results.
FIG. 19C depicts software smoothed voltage mapping.
Figure 20:
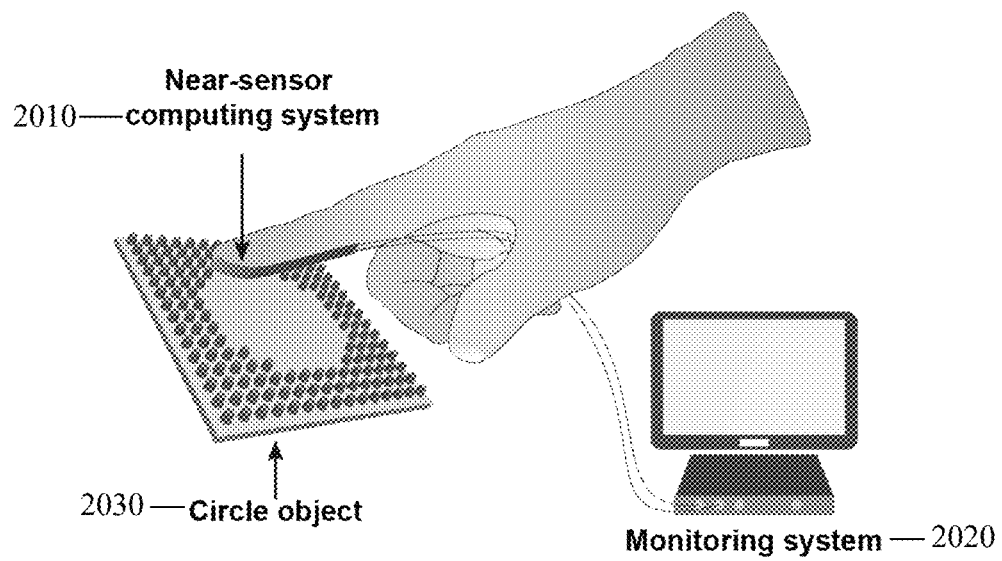
FIG. 20 depicts an illustration of an experimental setup for edge detection of the flexible near-sensor analogue computing system in accordance with the present embodiments mounted on a finger to scan a circle mold.
Figure 21:
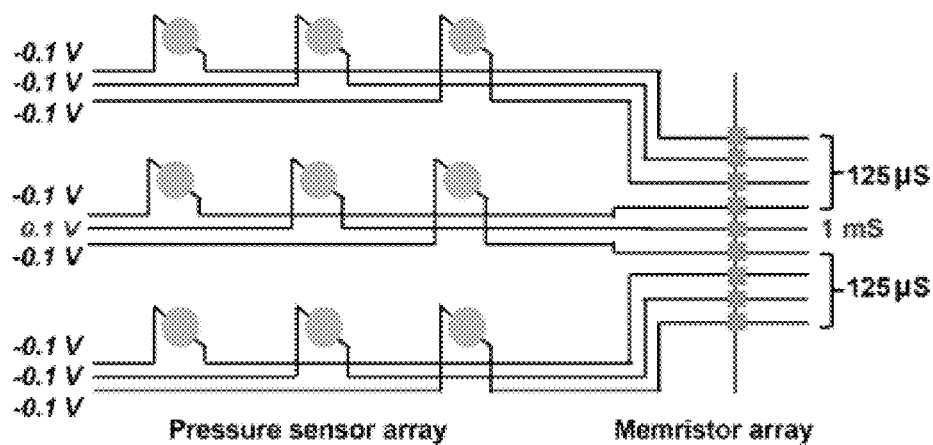
FIG. 21 depicts a schematic illustration of a system configuration for a Laplacian filter with a combination of read voltage and memristor conductance in accordance with the present embodiments.

To process the entire 40×40 pixels fingerprint pattern for noise reduction, the 3×3 tactile sensor array was pressed across the entire mold with a stride of one as shown in the illustration 1560. Because no zero-padding was used, the final dimension of the processed image is 38×38 pixels (40−3+1). The resulting $V_{Monitoring}$ that was mapped experimentally was similar to the simulated one obtained under ideal conditions that excluded writing error and resistance of interconnection lines as shown in FIGS. 18A, 18B and 18C. After binarization, the experimental and simulated results are consistent with the fingerprint-like pattern and are identical to those processed by software that used an averaging filter algorithm as shown in FIGS. 19A, 19B and 19C. The results of noise reduction from experiment results (FIGS. 18A, 19A), simulation results (FIGS. 18B, 19B), and software results (FIGS. 18C, 19C) show good consistency Referring to FIG. 20, an illustration 2000 shows that the near-sensor analogue computing system 2010 connected to a monitoring system 2020 can be used for real-time pressure acquisition and edge detection of a pressure pattern such as a circle object 2030. The operational principle is similar to the fingerprint noise reduction process except for the read pulse voltages and conductance values of the memristor array. All pre-bias pulse voltages were set to −0.1 V except for $V_{p5}$, which is set to 0.1 V, and the conductance of all memristors was set to 125 µS except for the center one, which is set to 1 mS as shown in the schematic illustration 2100 of FIG. 21. This combination of pre-bias read voltage and memristor conductance forms a Laplacian filter with negative weights.

Figure 22:
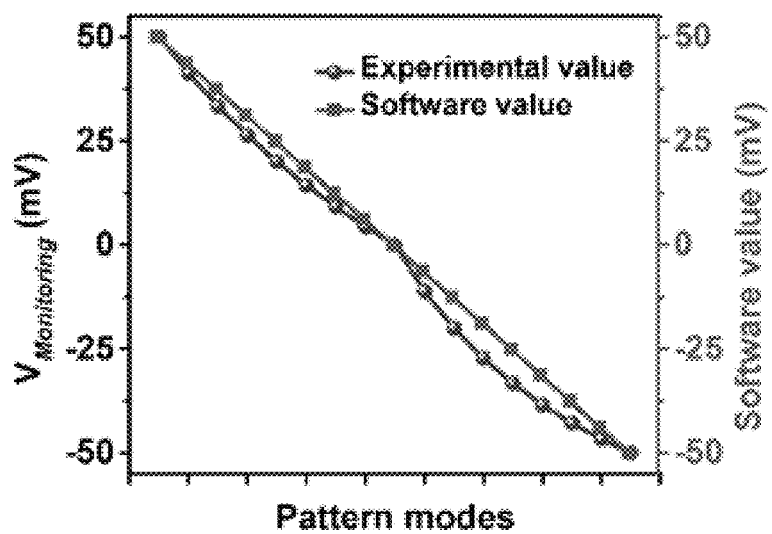
FIG. 22 depicts a graph of experimental $V_{Monitoring}$ values of the system of FIG. 20 and software calculated $V_{Monitoring}$ values in accordance with the present embodiments.
Figures 23A, 23B:
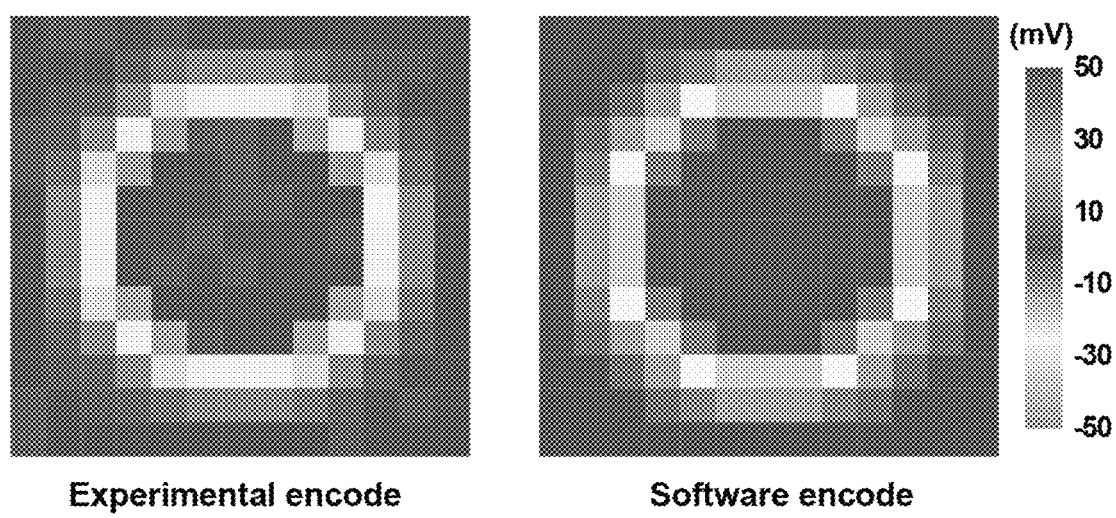

The flexible near-sensor analogue computing system 2010 was mounted on a human index finger and used to scan the circle mold 2030 in real time. The edge information of the circle was recorded in real-time as a series of $V_{Monitoring}$ values. The experimental $V_{Monitoring}$ values matched those calculated using software with a maximum deviation of only ~0.0086 V as shown in the graph 2200 of FIG. 22. The edge information of the whole object obtained experimentally as shown in FIG. 23A and from software as shown in FIG. 23B were nearly identical. Together, these results demonstrate that near-sensor analogue computing for skin perception in accordance with the present embodiments is possible and feasible.

Figure 24:
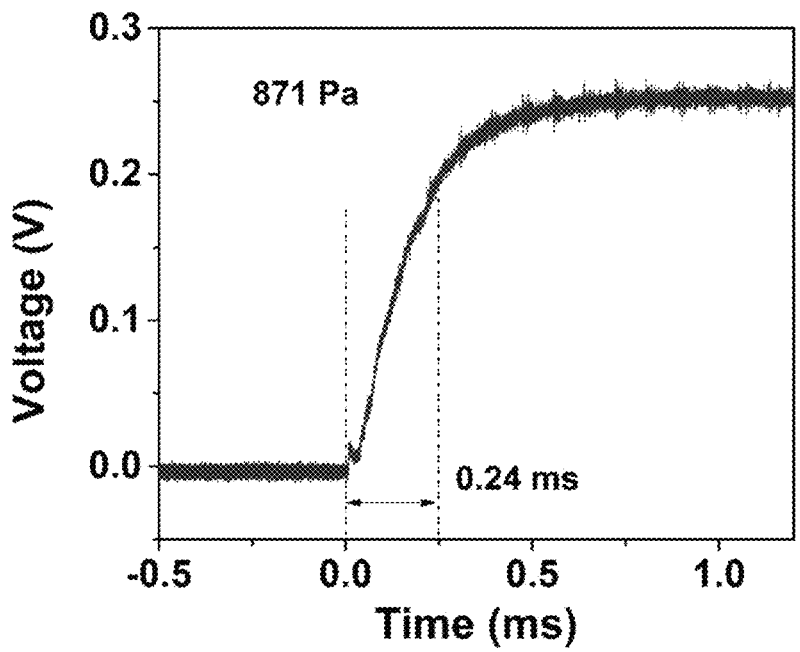
FIG. 24 depicts a graph of response time of the pressure sensor unit of the near-sensor analogue computing system in accordance with the present embodiments.
Figure 25:
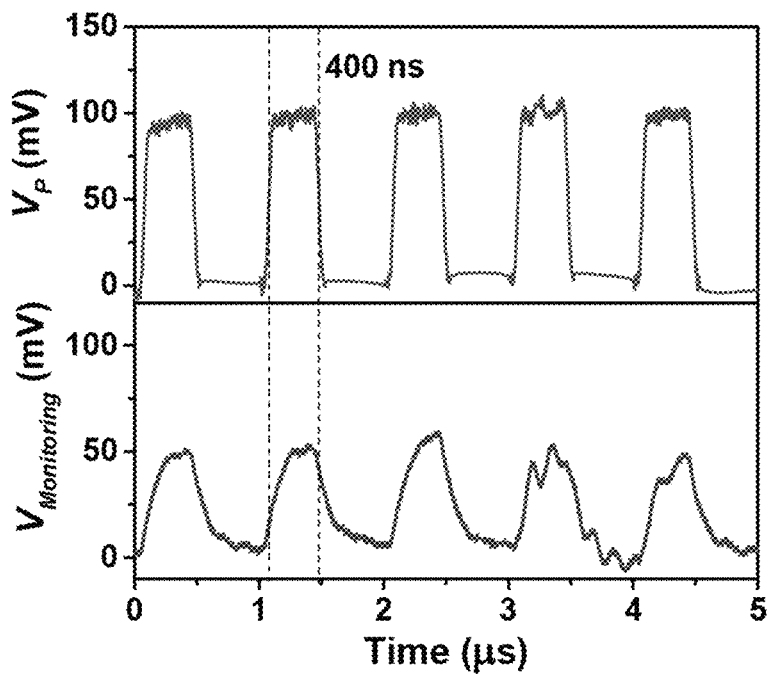
FIG. 25 depicts a graph showing the ultrafast response of the sensing-computing operation with five successive readout pulses of the near-sensor analogue computing system in accordance with the present embodiments.

One of the key advantages of the near-sensor analogue computing system in accordance with the present embodiments is its ability to process incoming sensory signals rapidly without analogue to digital conversion. To determine the response time of the system from sensing to computing, we excluded the intrinsic response time (~0.24 ms) of the pressure sensors by applying pressure of 871 Pa to the sensors prior to any measurements as shown in the graph 2400 of FIG. 24. One sensing-computing operation in the noise reduction had a readout pulse width of 400 ns and an interval time of 1 µs as shown in the graph 2500 of FIG. 25. This response speed translates to a processing capacity of one million operations per second. Notably, this value is limited by the parasitic capacitance of the measurement system, which can be substantially improved by adopting an application-specific integrated circuit technique.

For noise reduction, the near-sensor analogue computing system in accordance with the present embodiments consumed a maximum static average power of about 2 µW. In the case of edge detection, it consumed 7.84 µW. For both noise reduction and edge detection, the maximum power consumption occurs when all pressure sensors are in the ON-state. In the case of noise reduction, the maximum static power consumption is calculated as $(0.1\ V)^2/\{(9\ k\Omega + 40\ \Omega)/9 + 1\ k\Omega\} = 5$ µW. Considering the duty ratio of pre-bias voltage pulses (400 ns/1 µs), the maximum static average power consumption is 5 µW×4/10=2 µW. In the case of edge detection, the maximum static power consumption is roughly calculated as $(0.1\ V + 0.1\ V)^2 \times /\{(8\ k\Omega + 40\ \Omega)/8 + (1\ k\Omega + 40\ \Omega)\} = 19.6$ µW. The maximum static average power consumption is 19.6 µW×4/10=7.84 µW.

Figure 26A:
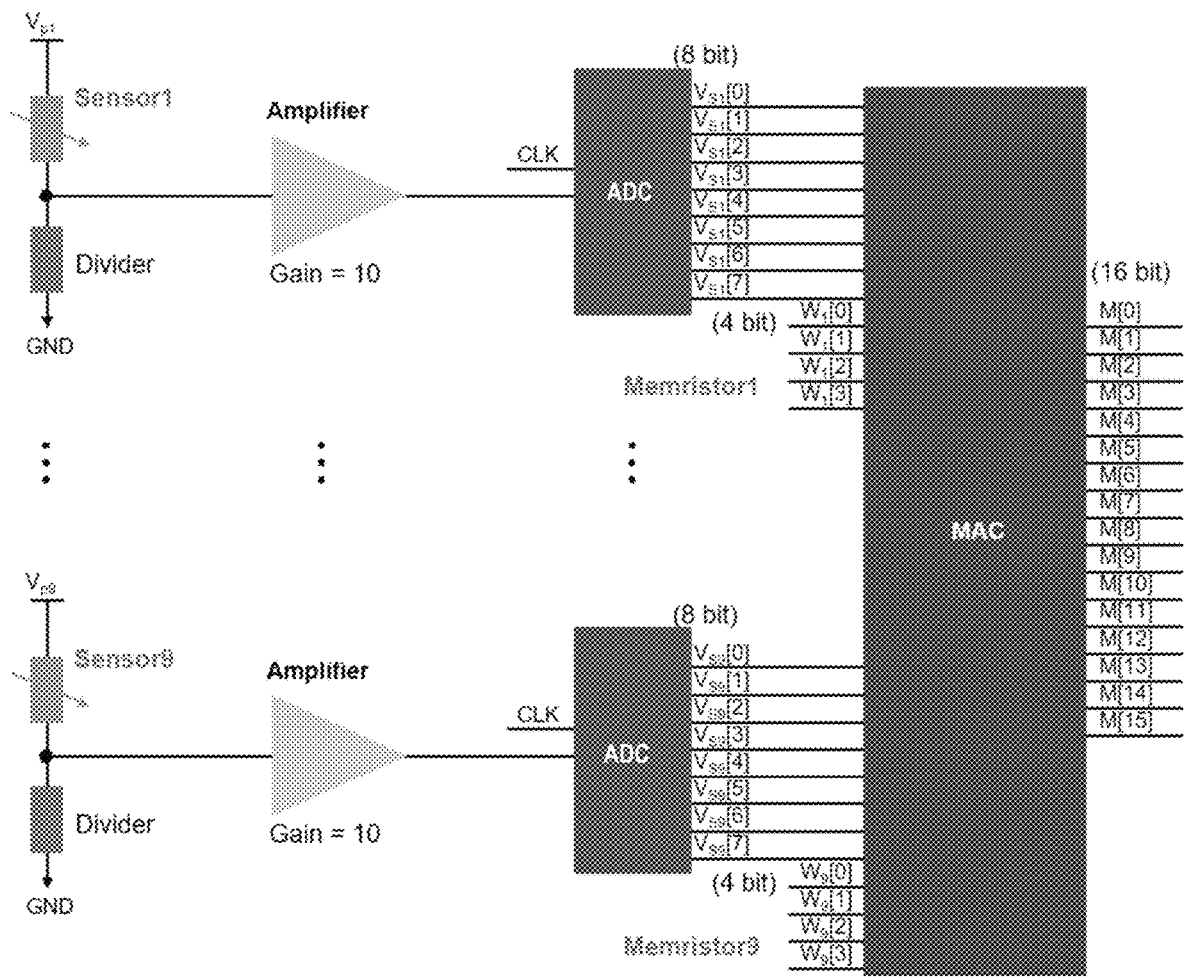
FIG. 26A depicts a schematic diagram of the simulated system and FIG. 26B depicts a timing diagram of the 16-bit digital signal output of the simulated system.
Figure 26B:
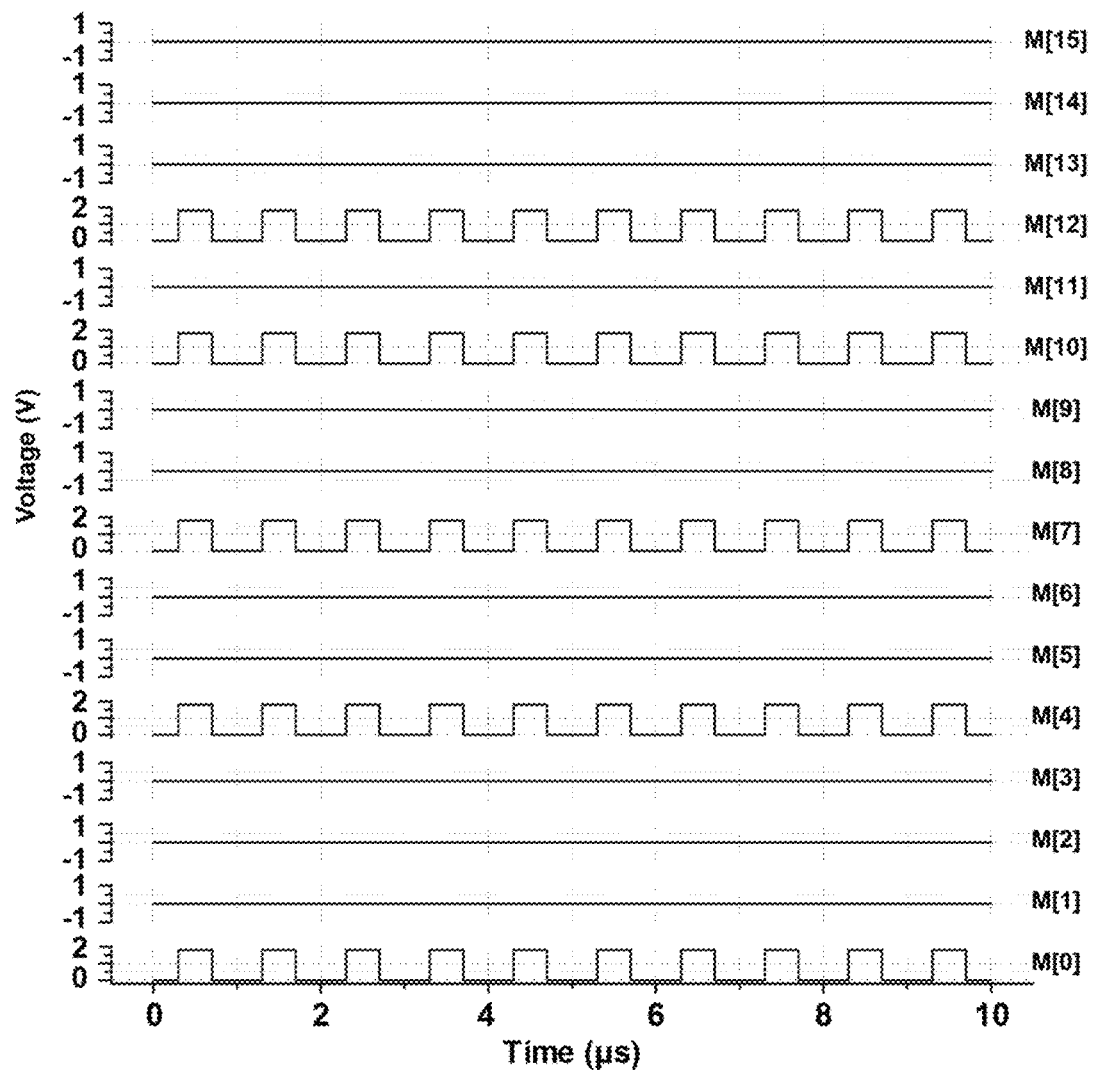

As comparison, the Cadence software tool from Cadence Design Systems of San Jose, California, USA, was used to design a conventional interface electronic system that can perform the same sensing-computing functionality as the near-sensor analogue system in accordance with the present embodiments. The interface system simulated by the Cadence software is depicted in a schematic illustration 2600 in FIG. 26A and consists of typical complementary metal-oxide semiconductor (CMOS) circuit components. The interface system consists of nine parallel branches and a digital multiply-accumulator (MAC) block outputting a 16-bit digital signal as shown in the timing diagram 2650 of FIG. 26B. The nine parallel branches consist of nine dividers, nine front-end amplifiers (gain=10), and nine 8-bit analogue-to-digital converters (ADCs). Analogue sensory signals are converted into an 8-bit digital data through the divider, amplifier and ADC. The 8-bit digital signals in conjunction with 4-bit weight values of nine memristors are sent to the MAC block to execute the VMM operation. The output of MAC is a 16-bit digital signal. Based on the average power consumption of typical commercial products that meet system requirements, such as LTC6261, AD7478, and XC2C32A, the interface system was estimated to consume about 8.24 mW of power as shown in TABLE 1.

TABLE 1

| Components | Amplifier | ADC | MAC |
|---|---|---|---|
| Functionality | Signal amplification | Signal conversion from analogue to digital domain | |
| Commercial products | LTC6261 | AD7478 | XC2C32A |
| Average power consumption (mW) | 0.24 | 3.5 | 4.5 |
| System power (mW) | | 8.24 | |

Therefore, for both noise reduction and edge detection, the near-sensor analogue computing system in accordance with the present embodiments consumed more than three orders of magnitude less power than conventional interface electronic system. These results demonstrate that the near-sensor analogue computing system in accordance with the present embodiments advantageously offers promising opportunities for time- and power-hungry artificial skin applications.

The sensing characteristics of the pressure sensors were measured using electrical measurement equipment (Keithley 4200-SCS from Keithley Instruments Company of Cleveland, Ohio, USA) and mechanical measurement equipment (force measurement products from Mark-10 Corporation of Copiague, New York USA). The resistive switching behaviors of memristor devices, and the ultrafast response of the sensing-computing operation in the system were measured using the Keithley 4200-SCS with pulse modules. Arbitrary waveform generators (Agilent 33220A from Agilent Technologies of Santa Clara, California, USA) and an oscilloscope (Tektronix DPO5054B from Tektronix, Inc. of Beaverton, Oregon, USA) were used to monitor the response speed of the pressure sensor, the memristor device, and the response time of the system.

Thus, it can be seen that the present embodiments provide an ultrafast artificial skin system based on a near-sensor analogue computing architecture which can simultaneously capture and process tactile stimuli in real-time. The system consists of an ultrasensitive pyramidal pressure sensor array for pressure detection and a flexible memristor array for analogue sensory data computation without interface electronics. The memristor-based computing array exhibits reliable and programmable conductance states, and good mechanical flexibility, enabling localized computation in the artificial skin. The system has been shown to detect pressure signals in real time and simultaneously remove noisy pressure points that might be introduced by contaminated objects or improper contact. In addition, the system could be mounted on the finger or prosthesis to detect edge information of external objects in real time. The response time of one sensing-computing operation is 400 ns for the system, and the average power consumption is 1000 times lower than a conventional interface electronic system. Accordingly, such ultrafast and energy-efficient artificial skin system is positioned to reshape human-machine interactions and transform operation of many existing intelligent applications.

While exemplary embodiments have been presented in the foregoing detailed description of the present embodiments, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing exemplary embodiments of the invention, it being understood that various changes may be made in the function and arrangement of steps and method of operation described in the exemplary embodiments without departing from the scope of the invention as set forth in the appended claims.

What is claimed is:

1. A tactile near-sensor analogue computing system comprising:
   a tactile sensor array configured to capture data, the tactile sensor array comprising a plurality of tactile sensing devices; and
   a memristive computing array configured to process the data, the memristive computing array comprising a plurality of memristive devices, each of the plurality of tactile sensing devices is connected to one of the plurality of memristive devices, wherein each of the plurality of memristive devices is programmed to a specific conductance value to execute one of a plurality of computation tasks, and wherein the plurality of computation tasks comprises noise reduction and edge detection of pressure stimuli.

2. The system in accordance with claim 1 wherein each of the plurality of memristive devices directly interfaces to one of the plurality of tactile sensing devices for receiving and processing non-converted captured data.

3. The system in accordance with claim 2 wherein the tactile sensor array comprises a m×n array of the plurality of tactile sensing devices, and wherein the memristive computing array comprises a m×n×k array of the plurality of memristive devices, and wherein the ones of the plurality of memristive devices directly interfaced to the plurality of tactile sensing devices comprises memristive devices in a m×n array having a common value of k.

4. The system in accordance with claim 1 wherein each of the plurality of tactile sensing devices comprises a piezoresistive sensor or a piezoelectric sensor.

5. The system in accordance with claim 4 wherein the piezoresistive sensor comprises a pyramidal pressure sensor unit comprising pyramidal microstructured polydimethylsiloxane (PDMS) elastomers coated with silver nanowires (AgNWs).

6. The system in accordance with claim 1 wherein each of the plurality of memristive devices comprises a resistive switching unit, a phase change memory, a magnetoresistive switching unit, or a ferroelectric switching unit.

7. The system in accordance with claim 6 wherein the resistive switching unit comprises two thin film layers of conductive electrodes sandwiching a layer of titanium tungsten (TiW) and a layer of the hafnium oxide ($HfO_2$).

8. An artificial skin system comprising:
   a tactile sensor array configured to capture data, the tactile sensor array comprising a plurality of tactile sensing devices; and
   a flexible memristive computing array configured to process the data, the memristive computing array comprising a plurality of memristive devices, each of the plurality of tactile sensing devices directly interfacing to one of the plurality of memristive devices, wherein the each of the plurality of memristive devices directly interfacing one of the plurality of tactile sensing devices receives and processes non-converted data captured therefrom, and wherein each of the plurality of memristive devices is programmed to a specific conductance value to execute one of a plurality of computation tasks, and wherein the plurality of computation tasks comprise noise reduction and edge detection of pressure stimuli.

9. The artificial skin system in accordance with claim 8 wherein the tactile sensor array comprises a m×n array of the plurality of tactile sensing devices, and wherein the memristive computing array comprises a m×n×k array of the plurality of memristive devices, and wherein the ones of the plurality of memristive devices directly interfaced to the plurality of tactile sensing devices comprises memristive devices in a m×n array having a common value of k.

10. The artificial skin system in accordance with claim 8 wherein each of the plurality of tactile sensing devices comprise a piezoresistive sensor or a piezoelectric sensor.

11. The artificial skin system in accordance with claim 10 wherein the piezoresistive sensor comprises a pyramidal pressure sensor comprising pyramidal microstructured polydimethylsiloxane (PDMS) elastomers coated with silver nanowires (AgNWs).

12. The artificial skin system in accordance with claim 8 wherein each of the plurality of memristive devices comprises a resistive switching device, a phase change memory, a magnetoresistive switching device or a ferroelectric switching device.

13. The artificial skin system in accordance with claim 12 wherein the resistive switching unit comprises two thin film layers of conductive electrodes sandwiching a layer of titanium tungsten (TiW) and a layer of the hafnium oxide ($HfO_2$).

* * * * *